(12) United States Patent
Kishimoto

(10) Patent No.: US 7,857,081 B2
(45) Date of Patent: Dec. 28, 2010

(54) CONTROL SYSTEM AND METHOD FOR HYBRID VEHICLE

(75) Inventor: Takeshi Kishimoto, Aichi-ken (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/501,050

(22) Filed: Jul. 10, 2009

(65) Prior Publication Data

US 2010/0006360 A1    Jan. 14, 2010

(30) Foreign Application Priority Data

Jul. 11, 2008    (JP) .............................. 2008-181304

(51) Int. Cl.
*B60K 6/28*    (2007.10)
*B60W 20/00*    (2006.01)

(52) U.S. Cl. .............................. 180/65.27; 180/65.285

(58) Field of Classification Search .............. 180/65.21, 180/65.22, 65.225, 65.265, 65.27, 65.285, 180/65.29; 701/48, 70; 290/50; 903/930
See application file for complete search history.

(56) References Cited

U.S. PATENT DOCUMENTS

| | | | |
|---|---|---|---|
| 5,582,262 A * | 12/1996 | Wust | 180/2.1 |
| 5,635,805 A * | 6/1997 | Ibaraki et al. | 318/139 |
| 6,792,341 B2 * | 9/2004 | Hunt et al. | 701/22 |
| 7,215,034 B2 * | 5/2007 | Hino et al. | 290/40 C |
| 7,389,837 B2 * | 6/2008 | Tamai et al. | 180/65.29 |
| 2001/0013702 A1 * | 8/2001 | Yanase et al. | 290/40 C |
| 2001/0048226 A1 | 12/2001 | Nada | |
| 2006/0174624 A1 * | 8/2006 | Grabowski et al. | 60/709 |
| 2008/0053721 A1 * | 3/2008 | Hoshiba et al. | 180/65.2 |
| 2008/0234897 A1 | 9/2008 | Tsuchida | |

FOREIGN PATENT DOCUMENTS

| | | | |
|---|---|---|---|
| JP | 2001329684 A | 11/2001 | |
| JP | 2006213273 A | 8/2006 | |
| JP | 2007129799 A | 5/2007 | |
| JP | 2007137299 A | 6/2007 | |

* cited by examiner

*Primary Examiner*—Frank B Vanaman
(74) *Attorney, Agent, or Firm*—Gifford, Krass, Sprinkle, Anderson & Citkowski, P.C.

(57) ABSTRACT

A control system for a hybrid vehicle in which, even if during traveling of the hybrid vehicle, a battery defect arises in a high-voltage power source, battery-less emergency traveling can be achieved over a sufficiently long distance, and the steering assist force can be effectively prevented from changing rapidly during traveling. The control section includes high-voltage power source defect processing unit. During execution of a mode in which the high-voltage power source, is reduced so that the reduced voltage is supplied to an electric power steering device (EPS), when a defect occurs in the high-voltage power source, the high-voltage power source defect processing unit shifts to a mode in which the low voltage of a low-voltage power source is increased so that the increased voltage is supplied to the EPS. The high-voltage power source defect processing unit then disconnects the high-voltage power source and the driving circuit from each other.

9 Claims, 10 Drawing Sheets

CONTROL SYSTEM AND METHOD FOR HYBRID VEHICLE

PRIORITY INFORMATION

This application claims priority to Japanese Patent Application No. 2008-181304 filed on Jul. 11, 2008, which is incorporated herein by reference in its entirety.

BACKGROUND

The present invention relates to a control system and a control method for a hybrid vehicle driven to travel by unit of at least one of an engine and a traveling motor and including a generator driven by the engine, a high-voltage power source connected to the generator and the traveling motor via a driving circuit, a low-voltage power source charged at a voltage lower than that of the high-voltage power source, and an electric power steering device connected to the driving circuit via a voltage-reducing circuit and driven by supplied power of a voltage intermediate between the low voltage of the low-voltage power source and the high voltage of the high-voltage power source.

RELATED ART

Hybrid vehicles driven to travel by unit of at least one of an engine and a traveling motor have been proposed and actually used in some applications. Such proposed hybrid vehicles comprise a generator driven by the engine, a high-voltage battery that is a high-voltage power source of 244 V or the like connected to the generator and the traveling motor via a driving circuit, and a low-voltage battery that is a low-voltage power source charged at a voltage of 12 V or the like which is lower than that of the high-voltage battery. There has also been proposed a hybrid vehicle which includes an electric power steering device that uses an actuator such as an electric motor or the like to apply a steering assist force to a steering shaft coupled to a steering wheel in the same direction as that in which a force is applied to the steering wheel. Furthermore, there has been proposed an electric power steering device which applies the steering assist force to an output shaft such as a rack bar that pushes and pulls steered wheels rather than to the steering shaft. The proposed electric power steering device can be driven by a supplied voltage of 42 V or the like which is intermediate between the low voltage of the low-voltage battery and the high voltage of the high-voltage battery.

Furthermore, there has been proposed a hybrid vehicle with an electric power steering device in which the high voltage of a high-voltage battery is reduced to an intermediate voltage of 42 V or the like, which is then supplied to the electric power steering device. In this configuration, if a defect occurs in the high-voltage battery during traveling owing to an abnormality in the internal resistance of the high-voltage battery or the like, the vehicle is immediately brought into a "ReadyOFF" state; that is, the state in which no power is supplied to a traveling motor, rather than being allowed to carry out battery-less emergency traveling in which the vehicle can travel without using the high-voltage battery. Thus, driving of the wheels is immediately stopped.

Japanese Patent Laid-Open No. 2007-137299 describes a power supply control apparatus including hybrid control unit for controlling a traveling driving motor, an electric power steering device having an electric actuator that operates by utilizing, as a power source, a main battery used as a driving power source for the traveling motor, the electric power steering device being different from the hybrid control unit and controlling the electric actuator and thus the operational traveling state of the vehicle, and voltage conversion unit for converting the voltage of the main battery, serving as a power source for the electric actuator of the electric power steering device, into an appropriate voltage, the power supply control apparatus controlling a power supply from the main battery to the electric actuator, wherein the hybrid control unit includes control instructing unit for outputting a control instruction for controlling the voltage-converting operation of the voltage conversion unit. The power supply control apparatus further includes an auxiliary battery offering a lower voltage than the main battery. The voltage conversion unit has a voltage-reducing circuit that reduces the voltage of the main battery, and a voltage-increasing circuit increasing the voltage of the auxiliary battery. Upon receiving an instruction to permit performance of a voltage conversion operation, the voltage conversion unit activates the voltage-reducing circuit to output the power of the main battery. When the instruction from the control instructing unit changes from the permission instruction to an inhibition instruction, the voltage conversion unit stops the operation of the voltage-reducing circuit, while activating the voltage-increasing circuit.

Japanese Patent Laid-Open No. 2001-329884 describes a hybrid vehicle in which an engine and rotating shafts of motors MG1 and MG2 are mechanically coupled together via a planetary gear. Each of the motors MG1 and MG2 is connected to an HV battery, serving as a secondary battery, via a driving circuit. The driving circuit includes pairs of switching elements each provided for a particular phase arranged between power supply lines connected to the HV battery via a system main relay. When a defect arises in the HV battery or the driving circuit, control processing is started when the defect is detected and is carried out after the system main relay has been turned off. The rotational speed of the motor MG1 is detected, and the maximum amount of power generated at the detected rotational speed is determined. Thus, a required torque Td for an axle is determined. The required torque Td is allowed to be output by determining the torque Tm of the motor MG2, determining the power consumption of the motor MG2, and limiting the output torque Tm such that the power consumption falls within the range of the maximum amount of power generated. Thereafter, the driving circuit is controllably turned on and off to subject the motor MG2 to powering control under the torque Tm. Furthermore, when a certain defect arises in the HV battery or the driving circuit, the vehicle can perform what is called battery-less traveling, with the system main relay turned off.

Japanese Patent Laid-Open No. 2007-129799 describes a hybrid vehicle driving apparatus including an HVECU, an engine, motor generators MG1 and MG2, and a main battery. Upon determining that a defect in the engine or the motor generator MG1 is detected, the HVECU stops the engine and the motor generator MG1. The HVECU further uses power stored in the main battery and an auxiliary battery to shift to limp-form traveling based only on the motor generator MG2. Upon determining that the charging amount of the main battery is equal to or lower than a predetermined value, a main control section of the HVECU switches a power supply path so that the motor generator MG2 is driven using power from the auxiliary battery instead of the main battery.

As described above, in the hybrid vehicle with the electric power steering device in which the high voltage of the high-voltage battery is reduced to the intermediate voltage of 42 V or the like, which is then supplied to the electric power steering device, if a defect arises in the high-voltage battery during traveling, the vehicle is immediately brought into the "Ready- OFF" state to quickly stop the driving of the wheels rather than being allowed to perform the battery-less emergency traveling. In this case, the vehicle may remain stopped on the road, and the battery-less emergency traveling may be disabled, and the driver cannot move the vehicle to a service station such as a repair shop.

In contrast, if the battery-less emergency traveling is enabled in the case of a defect in the battery, when the normal traveling shifts to the battery-less emergency traveling, a non-off switch such as the system main relay between the high-voltage battery and the traveling motor must be turned off. In this case, to avoid being melted, the on-off switch must be turned off after a current flowing through the on-off switch has been reduced to 0 A.

In this case, none of the loads connected to the high-voltage power source receive current during the normal traveling. The loads may include the electric power steering device. In contrast, when the power supply to the electric power steering device is stopped during traveling of the vehicle, the steering assist force exerted by the electric power steering device changes rapidly. This may make the driver feel discomfort. Thus, there has been proposed a method in which, in order to prevent the possible rapid change, the vehicle immediately shifts to the "ReadyOFF" state without being allowed to perform the battery-less emergency traveling, as described above. Furthermore, provided that the vehicle is stopped, even though the vehicle is immediately brought into the "ReadyOFF" state if a defect arises in the battery, the steering assist force of the electric power steering device is prevented from changing rapidly during traveling. Then, the next time the vehicle starts traveling, the operator can operate the steering wheel only by the operator's force without the need to apply the steering assist force of the electric power steering device to the steering device.

Under these circumstances, the following has been demanded. Even if a defect arises in the battery while the hybrid vehicle with the electric power steering device is traveling, the battery-less emergency traveling is enabled, in which the driver moves the vehicle to a service station. Furthermore, the steering assist force of the electric power steering device can be prevented from changing rapidly during traveling.

Thus, the present inventor has proposed the following method. If a defect arises in a high-voltage battery, the voltage of a low-voltage battery of 12 V or the like is increased, and the increased voltage is supplied to an electric power steering device. Thus, if a defect arises in the high-voltage battery, the battery can be backed up. However, the low-voltage battery has a small, limited capacity. Thus, if the low-voltage battery is used to drive the electric power steering device, consumable energy is reduced, making continued use of the low-voltage battery difficult. Consequently, the present inventor's method still has room for improvement in the following point: even if, during traveling of the hybrid vehicle with the electric power steering device, a defect arises in the battery, emergency traveling can be achieved over a sufficiently long distance.

Furthermore, all of Japanese Patent Laid-Open Nos. 2007-137299, 2001-329884, and 2007-129799 still have room for improvement in the following point: even if, during traveling of the hybrid vehicle with the electric power steering device, a defect arises in the battery of the high-voltage power source, the driver can move the vehicle to a service station without using the battery; that is, the vehicle can perform the battery-less emergency traveling over a sufficiently long distance, and the steering assist force can be effectively prevented from changing rapidly during traveling.

SUMMARY

An object of the present invention is to provide a control system and a control method for a hybrid vehicle in which, even if during traveling of the hybrid vehicle with an electric power steering device, a defect arises in a battery of a high-voltage power source, battery-less emergency traveling can be achieved over a sufficiently long distance, and the steering assist force can be effectively prevented from changing rapidly during traveling.

The present invention provides a control system for a hybrid vehicle driven to travel using at least one of an engine and a traveling motor as a main driving source, the hybrid vehicle comprising a generator driven by an engine, a high-voltage power source connected to the generator and the traveling motor via a driving circuit, a low-voltage power source charged at a voltage lower than that of the high-voltage power source, an electric power steering device connected to the driving circuit via a voltage-reducing circuit and driven by supplied power of a voltage intermediate between the low voltage of the low-voltage power source and the high voltage of the high-voltage power source, a voltage-increasing circuit provided between the low-voltage power source and the electric power steering device and configured to increase the low voltage of the low-voltage power source and to supply the increased voltage to the electric power steering device, and a control section, wherein the control section comprises first mode execution unit for allowing the voltage-reducing circuit to reduce the high voltage of the high-voltage power source and supplying a resultant intermediate voltage to the electric power steering device, second mode execution unit for allowing the voltage-increasing circuit to increase the low voltage of the low-voltage power source and supplying the resultant intermediate voltage to the electric power steering device, third mode execution unit for, with the high-voltage power source and the driving circuit disconnected from each other, allowing the voltage-reducing circuit to reduce a voltage corresponding to power generated by the generator and supplying the resultant intermediate voltage to the electric power steering device, and high-voltage power source defect processing unit for, while the first mode is being executed and a defect arises in the high-voltage power source, shifting from execution of the first mode to execution of the second mode, then disconnecting the high-voltage power source and the driving circuit from each other, and thereafter shifting the second mode to the third mode, while allowing the traveling motor to be driven by power generated by the generator.

In the control system for the hybrid vehicle according to the present invention, preferably, if a defect arises in at least one of the generator, the traveling motor, and the driving circuit during the shift to the third mode following the occurrence of the defect in the high-voltage power source, the high-voltage power source defect processing unit shifts from execution of the third mode to execution of the second mode.

Preferably, the control system for the hybrid vehicle according to the present invention further comprises a second voltage-reducing circuit provided between the driving circuit and the low-voltage power source, and after the shift to the second mode following the occurrence of the defect in the high-voltage power source, the high-voltage power source defect processing unit sets a second voltage-reducing circuit use start timing when a power supply from the generator to the low-voltage power source via the second voltage-reducing circuit is enabled, to be different from a voltage-reducing circuit use start timing when a power supply from the generator to the electric power steering device via the voltage reducing circuit is enabled. More preferably, the voltage-reducing circuit use start timing is set to take place earlier than the second voltage-reducing circuit use start timing.

Preferably, the control system for the hybrid vehicle according to the present invention further comprises voltage-detecting unit for detecting a voltage of the driving circuit, and if an abnormality occurs in the detected voltage value of the driving circuit after the shift to the third mode following the occurrence of the defect in the high-voltage power source, the high-voltage power source defect processing unit stops the power supply from the generator to the traveling motor.

Preferably, in the control system for the hybrid vehicle according to the present invention, the driving circuit comprises a switch provided between the high-voltage power source and both the generator and the traveling motor and configured to be turned on and off, a second voltage-reducing circuit provided between the driving circuit and the low-voltage power source, and a voltage-increasing and reducing circuit provided between the switch and both the generator and the traveling motor and configured to reduce the voltage supplied by the generator and to supply the reduced voltage to the voltage-reducing circuit and the second voltage-reducing circuit, the voltage-increasing and reducing circuit being configured to increase the voltage supplied by the high-voltage power source and to supply the increased voltage to at least one of the generator and the traveling motor.

The present invention also provides a control method for a hybrid vehicle driven to travel using at least one of an engine and a traveling motor as a main driving source and comprising a generator driven by an engine, a high-voltage power source connected to the generator and the traveling motor via a driving circuit, a low-voltage power source charged at a voltage lower than that of the high-voltage power source, an electric power steering device connected to the driving circuit via a voltage-reducing circuit and driven by supplied power of a voltage intermediate between the low voltage of the low-voltage power source and the high voltage of the high-voltage power source, a voltage-increasing circuit provided between the low-voltage power source and the electric power steering device and configured to increase the low voltage of the low-voltage power source and to supply the increased voltage to the electric power steering device, and a control section, wherein the control section comprises first mode execution unit for allowing the voltage reducing circuit to reduce the high voltage of the high-voltage power source and supplying a resultant intermediate voltage to the electric power steering device, second mode execution unit for allowing the voltage-increasing circuit to increase the low voltage of the low-voltage power source and supplying the resultant intermediate voltage to the electric power steering device, and third mode execution unit for, with the high-voltage power source and the driving circuit disconnected from each other, allowing the voltage-reducing circuit to reduce a voltage corresponding to power generated by the generator and supplying the resultant intermediate voltage to the electric power steering device, and the method comprises a high-voltage power source defect process step in which, while the first mode is being executed and when a defect arises in the high-voltage power source, the control section shifts from execution of the first mode to execution of the second mode, then disconnects the high-voltage power source and the driving circuit from each other, and thereafter shifts the second mode to the third mode, while allowing the traveling motor to be driven by power generated by the generator.

In the control method for the hybrid vehicle according to the present invention, preferably, in the high-voltage power source defect process step, if a defect arises in at least one of the generator, the traveling motor and the driving circuit during the shift to the third mode following the occurrence of the defect in the high-voltage power source, the control section shifts from execution of the third mode to execution of the second mode.

In the control method for the hybrid vehicle according to the present invention, preferably, the hybrid vehicle further comprises a second voltage-reducing circuit provided between the driving circuit and the low-voltage power source, and in the high-voltage power source defect process step, after the shift to the second mode following the occurrence of the defect in the high-voltage power source, the control section sets a second voltage-reducing circuit use start timing when a power supply from the generator to the low-voltage power source via the second voltage-reducing circuit is enabled, to be different from a voltage-reducing circuit use start timing when a power supply from the generator to the electric power steering device via the voltage-reducing circuit is enabled. More preferably, the voltage-reducing circuit use start timing is set to take place earlier than the second voltage-reducing circuit use start timing.

In the control method for the hybrid vehicle according to the present invention, preferably, the hybrid vehicle further comprises voltage-detecting unit for detecting a voltage of the driving circuit, and in the high-voltage power source defect process step, if an abnormality occurs in the detected voltage value of the driving circuit after the shift to the third mode following the occurrence of the defect in the high-voltage power source, the control section stops the power supply from the generator to the traveling motor.

According to the control system and control method for the hybrid vehicle according to the present invention, even if, during traveling of the hybrid vehicle with the electric power steering device, a defect occurs in the battery of the high-voltage power source, the traveling motor can be driven using not only the power stored in the low-voltage power source but also the power from the generator. This enables the battery-less emergency traveling over a sufficiently long distance. Furthermore, before the high-voltage power source and the driving circuit are disconnected from each other, the vehicle shifts to the second mode, in which the voltage from the low-voltage power source is increased, with the increased voltage supplied to the electric power steering device. Thus, even though the high-voltage power source and the driving circuit are disconnected from each other in order to allow the battery-less emergency driving, the steering assist force can be prevented from changing rapidly during traveling.

Furthermore, the following configuration prevents the voltage of the driving circuit from becoming unstable: the control system for the hybrid vehicle according to the present invention further comprising the second voltage-reducing circuit provided between the driving circuit and the low-voltage power source, wherein, after the shift to the second mode following the occurrence of the defect in the high-voltage power source, the high-voltage power source defect processing unit sets the second voltage-reducing circuit use start timing when the power supply from the generator to the low-voltage power source via the second voltage-reducing circuit is enabled, to be different from the voltage-reducing circuit use start timing when the power supply from the generator to the electric power steering device via the voltage-reducing circuit is enabled, or the control method for the hybrid vehicle according to the present invention wherein the hybrid vehicle further comprises the second voltage-reducing circuit provided between the driving circuit and the low-voltage power source, and in the high-voltage power source defect process step, after the shift to the second mode following the occurrence of the defect in the high-voltage power source, the control section sets the second voltage-reducing circuit use start timing when the power supply from the generator to the low-voltage power source via the second voltage-reducing circuit is enabled, to be different from the voltage-reducing circuit use start timing when the power supply from the generator to the electric power steering device via the voltage-reducing circuit is enabled.

DESCRIPTION OF EXEMPLARY EMBODIMENTS

An embodiment according to the present invention will be described below in detail with reference to the drawings. FIGS. 1 to 10 show an exemplary embodiment of the present invention.

Figure 1:
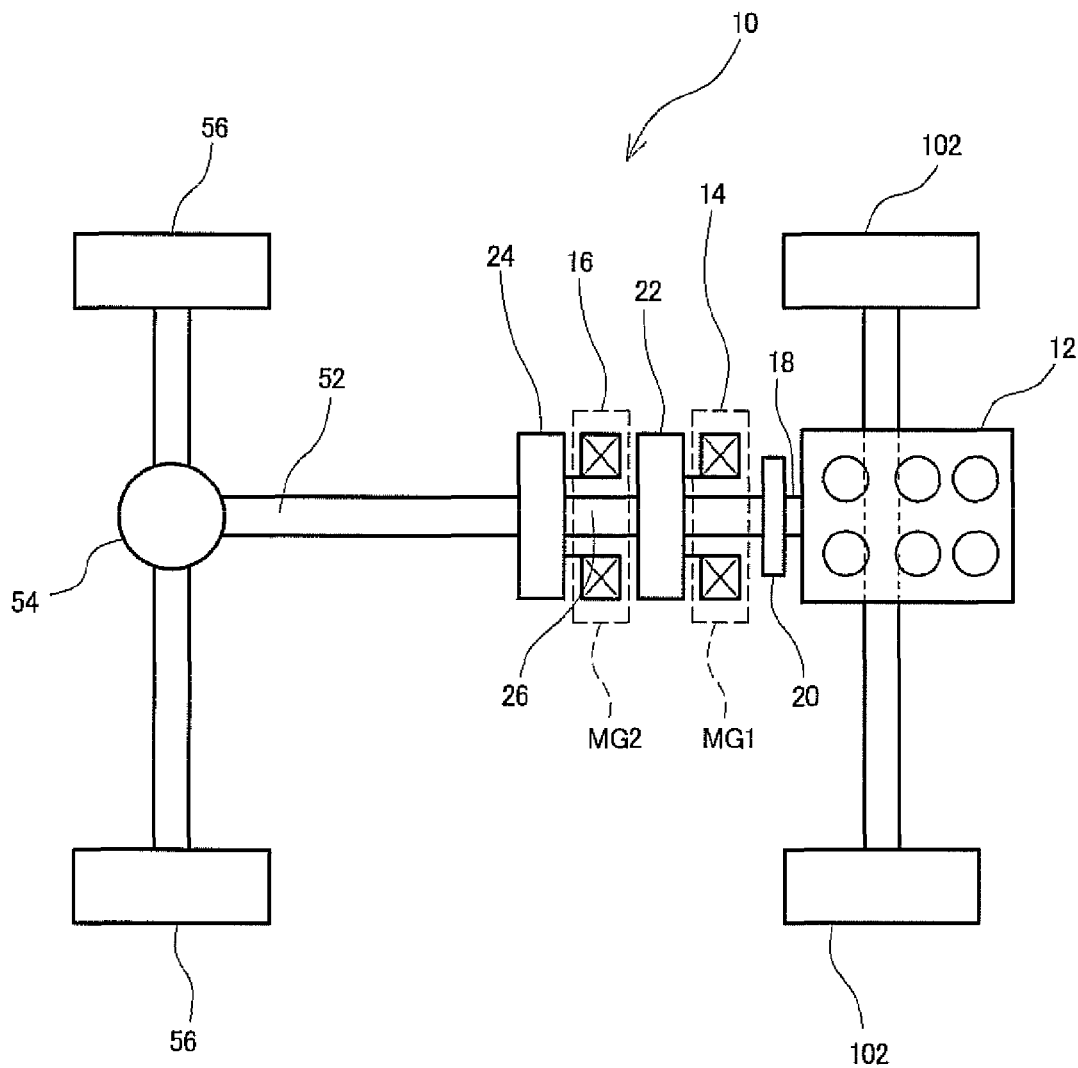
FIG. 1 is a schematic diagram of the configuration of a hybrid vehicle to be controlled by a control system in an exemplary embodiment according to the present invention.

As shown in FIG. 1, a hybrid vehicle 10 is an FR vehicle that is a rear-wheel-drive vehicle with a front engine. The hybrid vehicle to be controlled according to the present invention is not limited to the FR vehicle but may be an FF vehicle that is a front-wheel-drive vehicle with a front engine or a 4WD vehicle that is a four-wheel-drive vehicle. The hybrid vehicle 10 includes an engine 12, a generator (MG1) 14 that is a first motor generator, and a traveling motor (MG2) 16 that is a second motor generator. The hybrid vehicle 10 is driven to travel using at least one of the engine 12 and the traveling motor 16 as a main driving source.

For such traveling driving, in the hybrid vehicle 10, a power-dividing section 22 is coupled to a crank shaft 18 of the engine 12 via a damper 20. A rotating shaft of the generator 14 and an output shaft 26 of a speed-reducing gear section 24 with two stage speed-reducing mechanism are coupled to the power-dividing section 22. A rotating shaft of the traveling motor 16 is coupled to the speed-reducing gear section 24.

Figure 2:
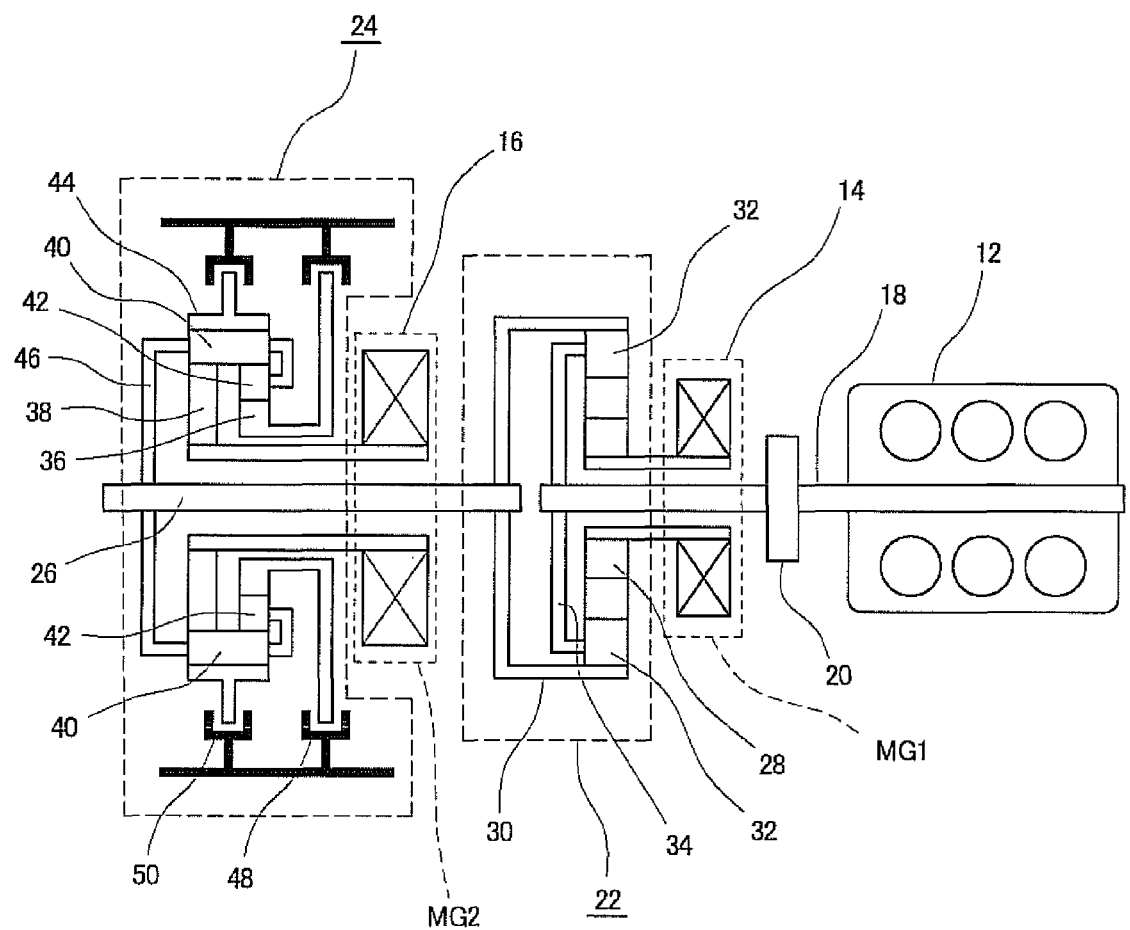
FIG. 2 is a diagram showing, in detail, the configuration of a section that transmits power between an engine and a generator (MG1) and a traveling motor (MG2) which are shown in FIG. 1.

As shown in FIG. 2, the power-dividing section 22 includes a planetary gear mechanism section having a sun gear 28, a ring gear 30 located around the periphery of the sun gear 28, a plurality of pinion gears 32 that mesh with the sun gear 28 and the ring gear 30, and a carrier 34 that supports the plurality of pinion gears 32 such that the pinion gears 32 can rotate and revolve. The crank shaft 18, a rotating gear of the engine 12, is coupled to the carrier 34 via the damper 20. A rotating shaft of the generator 14 is coupled to sun gear 28. The ring gear 30 is coupled to the output shaft 26, which outputs power to rear wheels 56 (FIG. 1).

The generator 14 is a three-phase alternating motor and can also be used as a motor for starting the engine 12; that is, a starter. However, when the generator 14 is used to provide the functions of a generator, torque input by the engine 12 via the carrier 34 is distributed, by the power-dividing section 22, to the generator 14, which is thus rotationally driven. The generator 14 is thus driven by the engine 12. In this case, the sun gear 28, to which the generator 14 is coupled, is subjected to torque and rotation in the reverse direction.

The speed-reducing gear section 24 is a compound planetary gear mechanism section including a front sun gear 36, a rear sun gear 38, a long pinion gear 40, a short pinion gear 42, a second ring gear 44, and a second carrier 46. The short pinion gear 42 meshes with the front sun gear 36 and the long pinion gear 40. The long pinion gear 40 meshes with the rear sun gear 38, the short pinion gear 42, and the second ring gear 44. The speed-reducing gear section 24 also includes a first braking section 48 and a second braking section 50.

An output from the traveling motor 16 is reduced, by operation of the first braking section 48 or the second braking section 50, to a low speed or a high speed, which is then delivered to the output shaft 26. That is, if the output from the traveling motor 16 is reduced to the low-side speed, the second ring gear 44, having more teeth than the rear sun gear 38, is fixed by the second braking section 50 to allow the output from the traveling motor 16 to be delivered to the output shaft 26 via the rear sun gear 38, the long pinion gear 40, and the second carrier 46. In contrast, if the output from the traveling motor 16 is reduced to the high-side speed, the front sun gear 36, having fewer teeth than the rear sun gear 38, is fixed by the first braking section 48 to allow the output from the traveling motor 16 to be delivered to the output shaft 26 via the rear sun gear 38, the long pinion gear 40, the short pinion gear 42, and the second carrier 46. The traveling motor 16 is a three-phase alternating motor and can also be used as a generator; that is, can be used to regenerate power for braking.

Rotation of the engine 12 is delivered to the output shaft 26 side and to the generator 14 side via the power-dividing section 22. Rotation speed of the generator 14 can be controlled in a stepless manner. By controlling the rotation speed, the generator 14 also serves to optimize the operating point of the engine 12 in order to improve fuel consumption. Now, turning back to FIG. 1, rotation of the output shaft 26 is transmitted, via a drive shaft 52 and a differential gear 54, to the rear wheels 56, driven wheels, which are thus driven.

Figure 3:
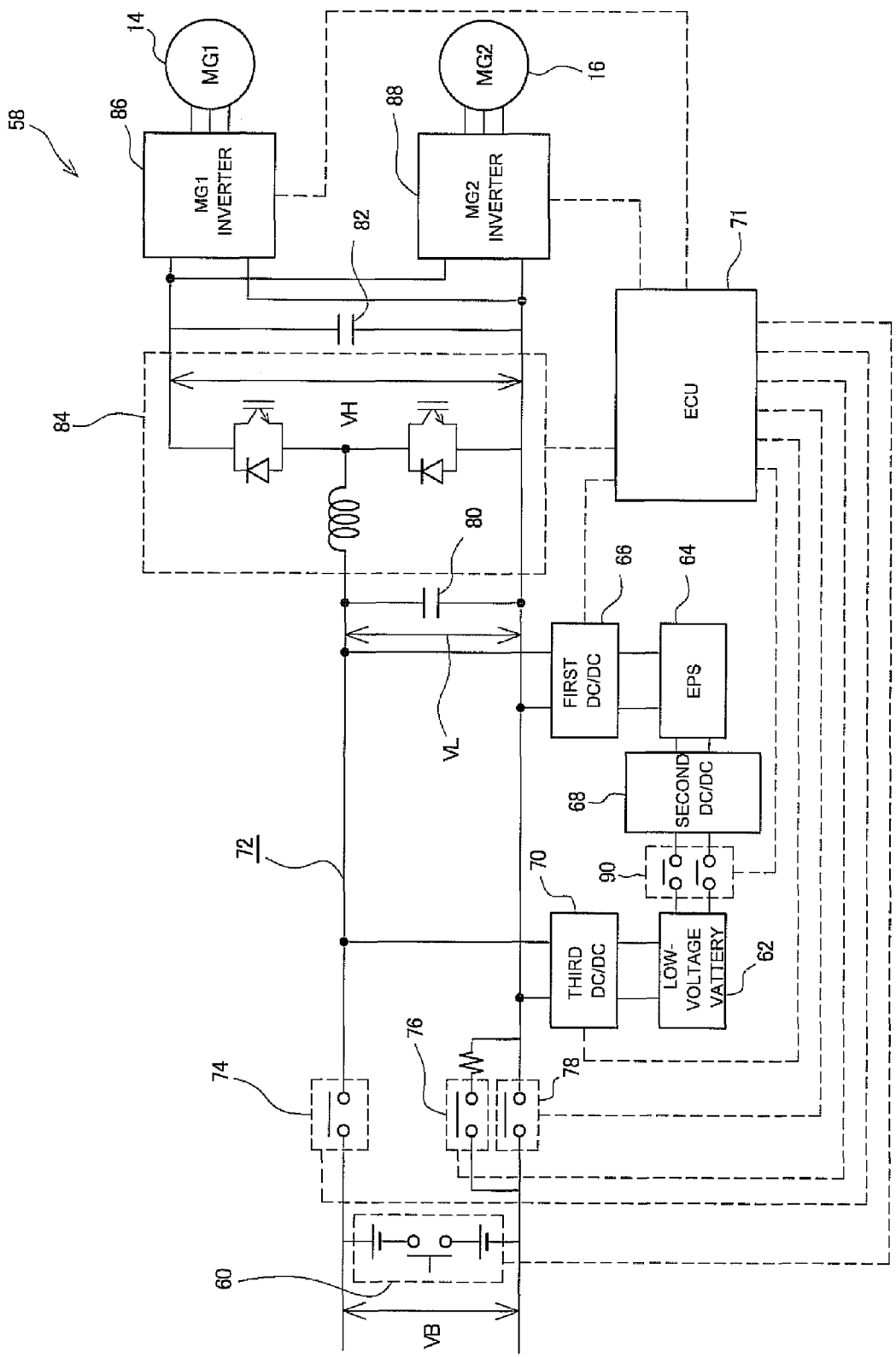
FIG. 3 is a schematic circuit diagram showing the control system for the hybrid vehicle in the exemplary embodiment according to the present invention.

FIG. 3 is a schematic circuit diagram showing a control system 58 for the hybrid vehicle 10 (FIG. 1) described above. In FIG. 3, the same elements as those shown in FIGS. 1 and 2 are denoted by the same reference numerals and repeated description is omitted. As shown in FIG. 3, the control system 58 includes the traveling motor 16 and the generator 14, a high-voltage battery 60 that is a power source of a high voltage of 244 V or the like which is used to drive the traveling motor 16, a low-voltage battery 62 that is a power source of a low voltage of 12 V or the like which is used for an auxiliary device, an EPS 64 that is an electric power steering device, a first DC/DC converter 66, a second DC/DC converter 68, and a third DC/DC converter 70 which are a voltage-reducing circuit, a voltage-increasing circuit, and a second voltage-reducing circuit, respectively, and a control section (ECU) 71. The generator 14 and the traveling motor 16 are connected to the high-voltage battery 60 via a driving circuit 72. The driving circuit 72 includes system relays (SMR) 74, 76, and 78, a first capacitor 80 and a second capacitor 82, a fourth DC/DC converter 84 that is a voltage-increasing and reducing circuit, a generator inverter 86, and a traveling motor inverter 88.

The fourth DC/DC converter 84 is provided between the group of the system relays 74, 76, and 78 and the group of the generator 14 and the traveling motor 16. The fourth DC/DC converter 84 includes a reactor, two switching elements such as transistors, and two diodes. The fourth DC/DC converter 84 can increase a DC voltage supplied by the first capacitor 80 and then supply the increased DC voltage to the second capacitor 82. That is, the fourth DC/DC converter 84 has the function of receiving a signal from the control section 71, and in response to the signal, increasing the DC voltage in association with the on time and off time of the switching elements to supply the increased DC voltage to the second capacitor 82. The fourth DC/DC converter 84 also has the function of, in response to a signal from the control section 71, reducing a DC voltage supplied by one or both of the generator inverter 86 and the traveling motor inverter 88 via the second capacitor 82, and to charge the reduced DC voltage into the high-voltage battery 60. In this case, the fourth DC/DC converter 84 has the function of receiving a signal from the control section 71, and in response to the signal, reducing a DC voltage in association with the on time and off time of the switching elements to supply the reduced DC voltage to the first capacitor 80. That is, the fourth DC/DC converter 84 can reduce the voltage supplied by the generator 14 to supply the reduced voltage to the first DC/DC converter 66 and the third DC/DC converter 70.

The high-voltage battery 60 is a secondary battery such as a nickel hydrogen battery or a lithium ion battery. The system relays 74, 76, and 78 are turned on or off in response to a signal from the control section 71. That is, in response to turn-on of a start switch (not shown in the drawings), the system relays 74, 76, and 78 are turned on by the control section 71 to connect the first capacitor 80 side of the driving circuit 72 to the high-voltage battery 60 side. Furthermore, in response to turn-off of the start switch, the system relays 74, 76, and 78 and thus the driving circuit 72 are turned off. The system relays 74, 76, and 78 are switches provided between the high-voltage battery and the generator 14 and traveling motor 16 and which can be turned on and off. Those among the system relays 74, 76, and 78 which are provided on a negative pole side include the system relay 76 to which a resistor is connected and the system relay 78 to which no resistor is connected. When the system relays 76 and 78 are turned on, one of the negative pole side system relays 76 and 78 is connected; that is, turned on.

The first capacitor 80 smoothes a DC voltage supplied by the high-voltage battery 60 to supply the smoothed DC voltage to the fourth DC/DC converter 84. The second capacitor 82 smoothes the DC voltage from the fourth DC/DC converter 84 to supply the smoothed DC voltage to the generator inverter 86 and the traveling motor inverter 88.

Each of the generator inverter 86 and the traveling motor inverter 88 includes arms for a U phase, a V phase, and a W phase (not shown in the drawings). Each of the arms includes two switching elements (not shown in the drawings) such as IGBTs or transistors which are connected together in series. The middle point of each of the arms is connected to a corresponding one of the three phases in the generator 14 or the traveling motor 16. The generator inverter 86 and the traveling motor inverter 88 are connected in parallel with the high-voltage battery 60.

When supplied with a DC voltage by the second capacitor 82, the generator inverter 86 converts the DC voltage into an AC voltage based on a signal corresponding to a torque instruction value from the control section 71, to drive the generator 14. The generator inverter 86 converts an AC voltage generated by the generator 14, driven by the engine 12 (FIG. 2) via the power-dividing section 22, into a DC voltage based on a signal from the control section 71 (FIG. 3). The generator inverter 86 then supplies the resultant DC voltage to the fourth DC/DC converter 84 via the second capacitor 82.

When supplied with a DC voltage by the second capacitor 82, the traveling motor inverter 88 converts the DC voltage into an AC voltage based on a signal corresponding to a torque instruction value from the control section 71, to drive the traveling motor 16. During regenerative braking of the hybrid vehicle 10 (FIG. 1), the traveling motor inverter 88 converts an AC voltage generated by the traveling motor 16 into a DC voltage based on a signal from the control section 71. The traveling motor inverter 88 then supplies the resultant DC voltage to the fourth DC/DC converter 84 via the second capacitor 82.

The control section 71 has the function of controlling the driving circuit 72 and includes a microcomputer having a CPU and a memory. The values of motor currents flowing through the respective phases in the generator 14 or the traveling motor 16 are input to the control section 71 by motor current sensors (not shown in the drawings) provided in the generator 14 and the traveling motor 16, respectively. The following are also input to the control section 71: a DC voltage VB output by the high-voltage battery 60 and detected by a first voltage sensor (not shown in the drawings) that is voltage detecting unit, a voltage VL across the first capacitor 80 detected by a second voltage sensor (not shown in the drawings) that is second voltage detecting unit, a voltage VH across the second capacitor 82 detected by a third voltage sensor (not shown in the drawings) that is third voltage detecting unit, and a torque instruction value and a motor rotation speed from an external ECU (not shown in the drawings).

The low-voltage battery 62 is charged at a low voltage of 12 V or the like which is lower than that of the high-voltage battery 60. The low-voltage battery 62 is connected to the control section 71 and an auxiliary device (not shown in the drawings). The EPS 64 is connected to the driving circuit 72 via the first DC/DC converter 66. The EPS 64 is driven by a supplied voltage that is intermediate between the low voltage of the low-voltage battery 62 and the high voltage of the high-voltage battery 60; for example, a voltage of 42 V. That is, the EPS 64 includes a steering assist mechanism that applies a steering assist force to front wheels 102 (FIG. 1) that are steered wheels, and an EPS control section that controls driving of an electric motor provided in the steering assist mechanism. The steering assist mechanism includes a torque sensor that detects the torque of a steering shaft rotated by operation of the steering wheel. The steering assist mechanism applies, via the electric motor, the steering assist force corresponding to the torque detected by the torque sensor and the rotating direction of the steering shaft (or/and a vehicle speed detected by a speed sensor). For such a configuration, the steering assist mechanism includes a power transmission section that transmits the power of the rotating shaft of the electric motor to the steering shaft. The EPS control section includes a calculation section that calculates the amount of electricity provided to the electric motor, and a motor-driving circuit having an inverter that drives the electric motor in accordance with a control signal from the calculating section. The power transmission section may be configured to transmit the rotation of the steering shaft to a rack bar provided in a rack and pinion mechanism that converts the rotation into axial movement, to thereby apply an axial steering assist force to the rack bar. In this case, for example, the electric motor provided in the steering assist mechanism is assembled into the rack bar to convert the turning force of the electric motor into the axial force of the rack bar via a ball spring mechanism. The turning force is thus transmitted to the rack bar.

The second DC/DC converter 68 is provided between the low-voltage battery 62 and the EPS 64. The second DC/DC converter 68 can increase the low voltage of the low-voltage battery 62 to supply the increased voltage to the EPS 64. A second system relay 90 serving as a turn-off section is provided between the low-voltage battery 62 and the second DC/DC converter 68. The second system relay 90 is controllably turned on and off by the control section 71.

The control section 71 has the function of controlling the first DC/DC converter 66, the second DC/DC converter 68, and the third DC/DC converter 70. The third DC/DC converter 70 is provided between the low-voltage battery 62 and the driving circuit 72. When the system relays 74, 76, and 78 are turned on, the third DC/DC converter 70 can reduce the high voltage of the high-voltage battery 60, such as 244 V, to a low voltage such as 12 V to supply the reduced voltage to the low-voltage battery 62.

Figure 4:
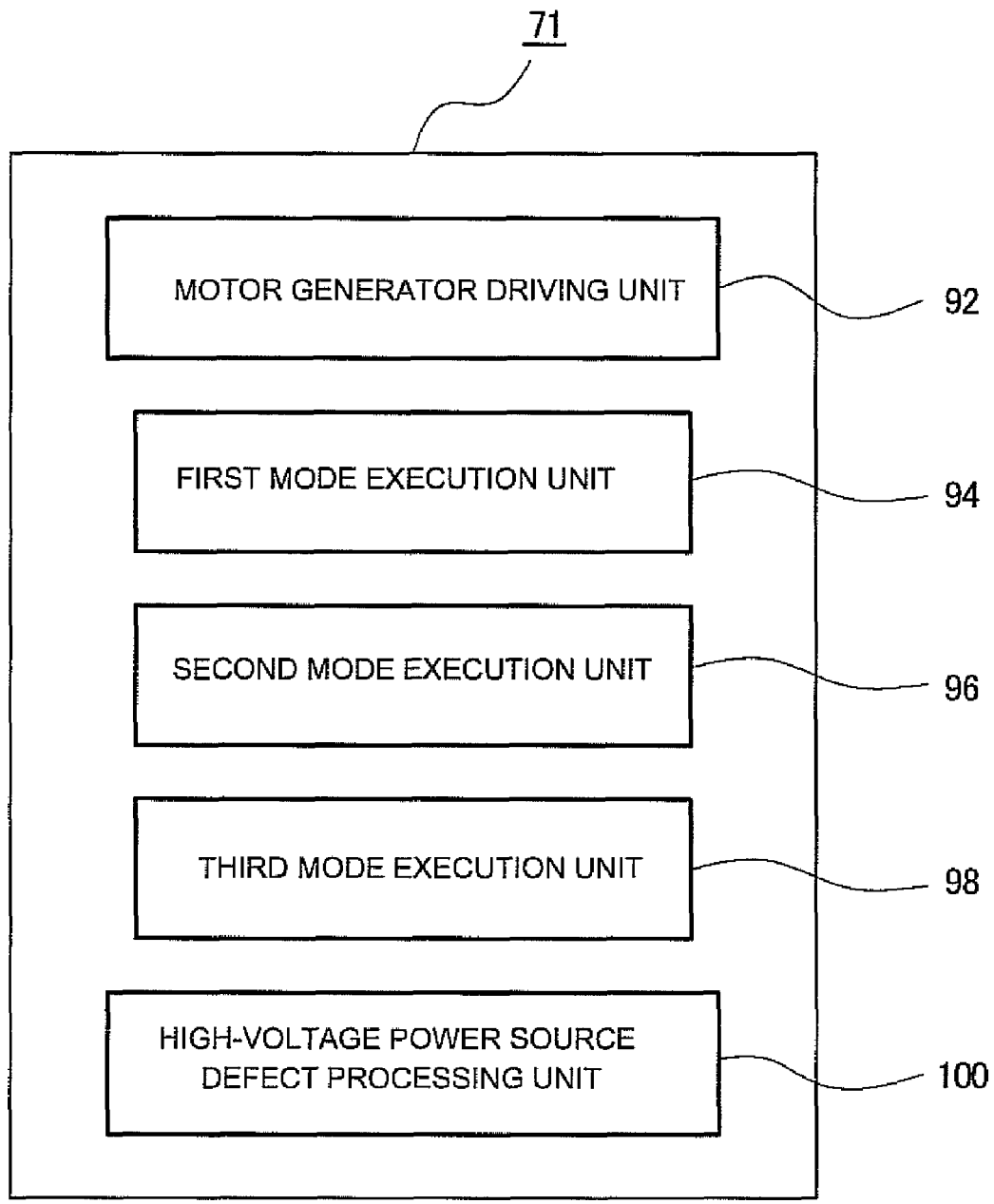
FIG. 4 is a block diagram showing the configuration of the control section in FIG. 3 in detail.

As shown in FIG. 4, the control section 71 has motor generator driving unit 92, first mode execution unit 94, second mode execution unit 96, third mode execution unit 98, and high-voltage power source defect processing unit 100. In the description below, the same elements as those shown in FIGS. 1 to 3 are denoted by the same reference numerals, and repeated description is omitted. To drive the generator 14 or the traveling motor 16, the motor generator driving unit 92 generates a signal allowing the switching elements in the inverter 86 (or 88) to be controlled based on the motor current value, the DC voltage VB from the high-voltage battery 60, an output voltage VH from the fourth DC/DC converter 84, and the torque instruction value and the motor rotation speed. The motor generator driving unit 92 then outputs the signal to the inverter 86 (or 88).

To allow the inverter 86 (88) to drive the generator 14 or the traveling motor 16, the control section 71 generates a signal allowing the switching elements in the fourth DC/DC converter 84 to be controlled based on the motor current value, the DC voltage VB from the high-voltage battery 60, the output voltage VH from the fourth DC/DC converter 84, and the torque instruction value and the motor rotation speed. The control section 71 then outputs the signal to the inverter 86 (or 88).

The control section 71 further generates a signal for converting the AC voltage generated by the generator 14 or the traveling motor 16 into a DC voltage. The control section 71 then outputs the signal to the inverter 86 (or 88). The control section 71 further generates a signal allowing the fourth DC/DC converter 84 to be controlled so that the DC voltage from the inverter 86 (or 88) is reduced, with the high-voltage battery 60 charged with the reduced voltage. The control section 71 then outputs the signal to the fourth DC/DC converter 84.

The first mode execution unit 94 carries out a first mode that is a high-voltage assist allowing the first DC/DC converter 66 to reduce the high voltage of the high-voltage battery 60 to supply the resultant intermediate voltage to the EPS 64.

The second mode execution unit 96 carries out a second mode that is a low-voltage assist allowing the second DC/DC converter 68 to increase the low voltage of the low-voltage battery 62 to supply the resultant intermediate voltage to the EPS 64.

The third mode execution unit 98 carries out a third mode that is a high voltage assist which, with the high-voltage battery 60 and the driving circuit 72 disconnected from each other as a result of the system relays 74, 76, and 78 being turned off, allows the first DC/DC converter 66 to reduce the voltage VL across the first capacitor 80, which corresponds to power generated by the generator 14, to supply the resultant intermediate voltage to the EPS 64.

While the first mode is being carried out and when a defect arises in the high-voltage battery 60, the high-voltage power source defect processing unit 100 shifts from execution of the first mode to execution of the second mode. The high-voltage power source defect processing unit 100 then turns off the system relays 74, 76, and 78 to disconnect the high-voltage battery 60 and the driving circuit 72 from each other. The high-voltage power source defect processing unit 100 thereafter shifts the second mode to the third mode and drives the traveling motor 16 by the power generated by the generator 14. In this configuration, when a defect arises in the high-voltage battery 60, the battery-less emergency traveling can be achieved in which the driver moves the vehicle to a service station such as a repair shop without using the high-voltage battery 60.

Figure 5:
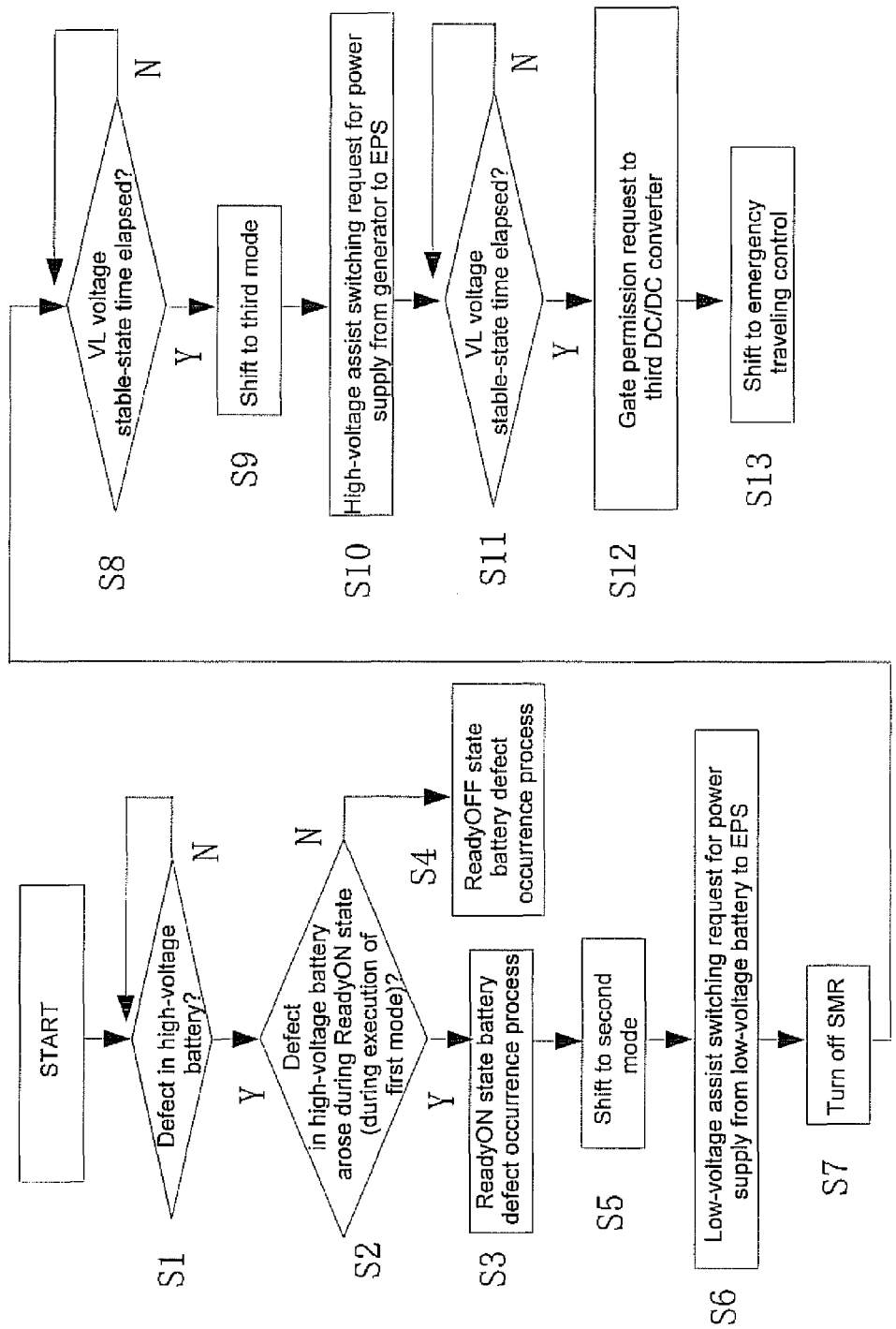
FIG. 5 is a flowchart showing steps of a method for controlling the hybrid vehicle in the exemplary embodiment according to the present invention, the steps being carried out until the vehicle shifts to emergency traveling control.

Now, a method of controlling the hybrid vehicle 10 using the above-described control system 58 will be described with reference to FIGS. 5 to 10. In the description below, the same elements as those shown in FIGS. 1 to 4 are denoted by the same reference numerals, and repeated description is omitted. As shown in FIG. 5, in the control method according to the present embodiment, first, in step S1, the high-voltage power source defect processing unit 100 determines whether or not any defect has arisen in the high-voltage battery 60. The defect as used herein refers to, for example, an abnormality in the internal resistance of the high-voltage battery 60 that reduces the DC voltage VB of the high-voltage battery 60 to a predetermined value or smaller. Upon determining, in step S1, that a defect has arisen, the high-voltage power source defect processing unit 100 determines in step S2 whether or not the defect in the high-voltage battery 60 arose during execution of the first mode, corresponding to the "ReadyON" state. The "ReadyON" state as used herein refers to the state in which the traveling motor 16 can be supplied with power and the vehicle can be started by turning on; that is, stepping on, the accelerator pedal (not shown in the drawings) (this definition applies throughout the specification).

Figure 6:
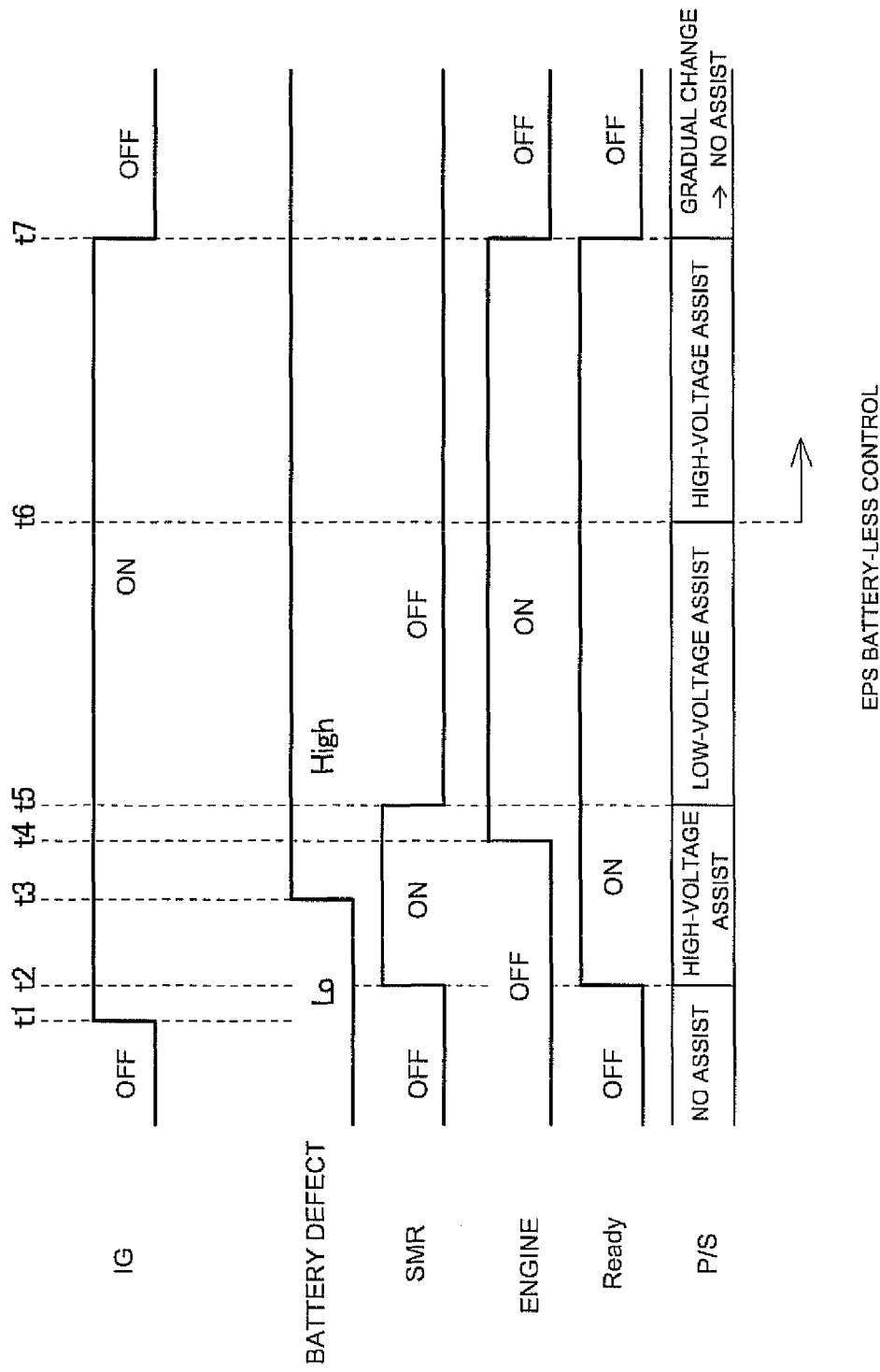
FIG. 6 is a time chart showing an example of a ReadyON state battery defect occurrence process.
Figure 7:
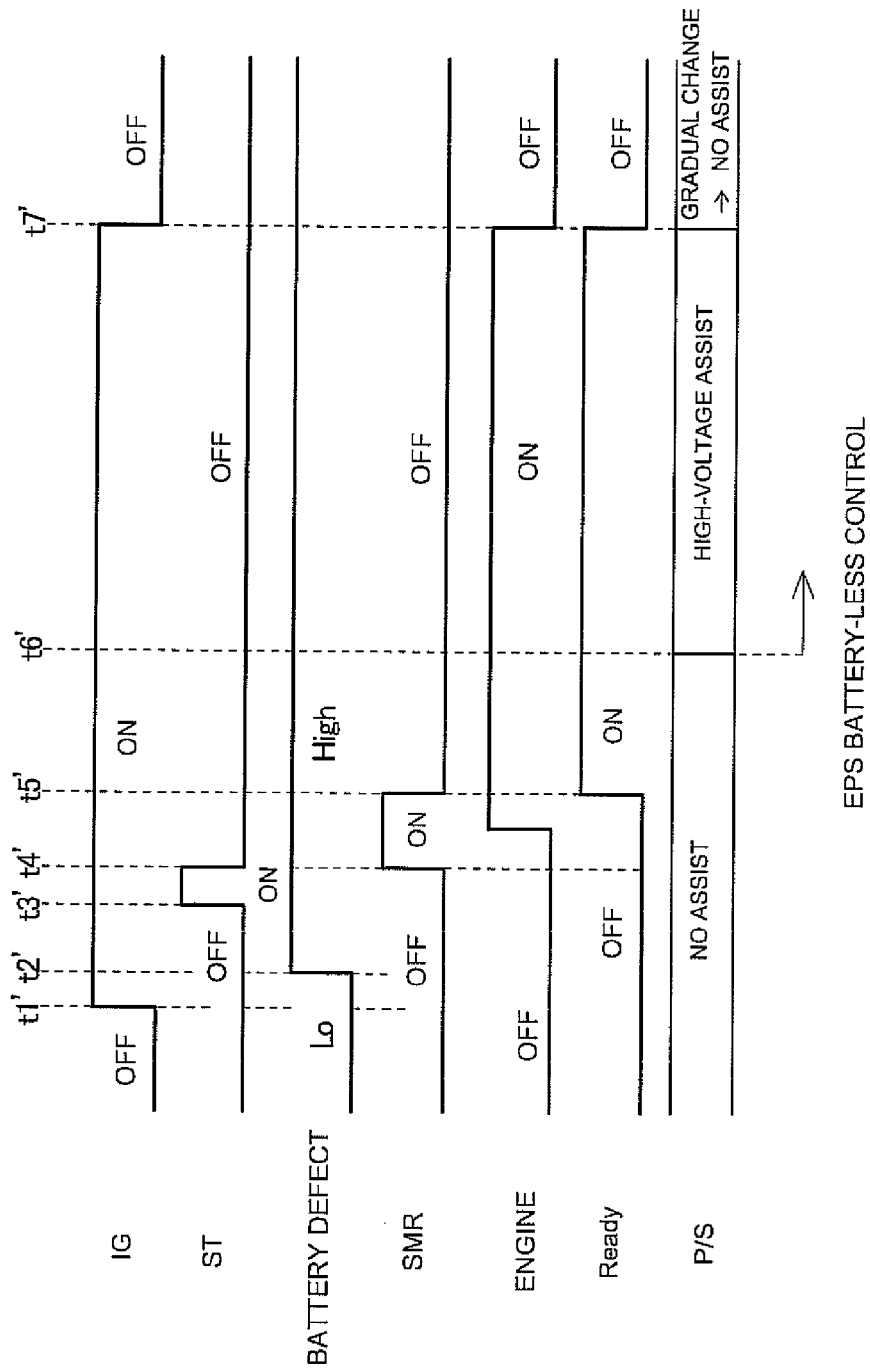
FIG. 7 is a time chart showing an example of a ReadyOFF state battery defect occurrence process.

Upon determining, in step S2, that the defect in the high-voltage battery 60 arose in the "ReadyON" state, the high-voltage power source defect processing unit 100 shifts to step S3 corresponding to a "ReadyON state battery defect occurrence process." In contrast, upon determining, in step S2, that the defect in the high-voltage battery 60 arose in a "ReadyOFF" state; that is, before the "ReadyON" state, the high-voltage power source defect processing unit 100 shifts to a "ReadyOFF state battery defect occurrence process" in step S4. FIG. 6 is a time chart showing an example of the ReadyON battery defect occurrence process. FIG. 7 is a time chart showing an example of the ReadyOFF battery defect occurrence process. In FIGS. 6 and 7, a line labeled "IG" indicates whether the start switch, providing the functions of an ignition switch for the engine 12, is turned on or off. For a line labeled "Battery defect," Lo indicates that no defect is occurring in the battery, and High indicates that a defect is occurring in the battery. A line labeled "SMR" indicates whether the system relays 74, 76, and 78 are turned on or off. For a line labeled "Engine 12," OFF indicates that the engine 12 is inoperative; that is, the engine 12 is stopped. ON indicates that the engine 12 is operative; that is, the engine 12 is in operation. A line labeled "Ready" indicates the ReadyON state or the ReadyOFF state. For a "P/S" portion, "No assist" indicates that the EPS 64 is inoperative. "High-voltage assist" indicates that the voltage supplied by the high-voltage battery 60 or the generator is reduced by the first DC/DC converter 66 or the fourth and first DC/DC converters 84 and 66, with the reduced voltage supplied to the EPS 64. "Low-voltage assist" indicates that the voltage supplied by the low-voltage battery 62 is increased by the second DC/DC converter 68, with the increased voltage supplied to the EPS 64. "Gradual change→no assist" indicates that after the engine 12 is stopped, the steering assist force exerted on the steering wheel by the EPS 64 gradually decreases to zero. For "ST" in FIG. 7, an on state indicates that a starter signal is turned on, which instructs the generator 14 to provide the functions of a starter. When the starter signal is turned on, the control section 71 controls the generator inverter 86 such that the generator 14 is supplied with power and driven to drive the engine 12 via the power-dividing section 22. After the engine 12 is driven, the generator 14 is rotationally driven to generate power, thus providing the functions of a generator.

For example, in the example shown in FIG. 6, the start switch is turned on at time t1, and the system relays 74, 76, and 78 are turned on at time t2. Turning on the system relays 74, 76, and 78 brings the vehicle into the ReadyON state. Thereafter, at time t3, a defect arises in the battery. Thus, in the example shown in FIG. 6, a defect arises in the high-voltage battery 60 during the "ReadyON" state. Furthermore, in the example shown in FIG. 7, at time t1', the start switch is turned on, and at time t2', a defect arises in the battery. Thereafter, at time t3', the starter signal is turned on, and the system relays 74, 76, and 78 are turned on (time t4'). Then, the engine 12 is actuated, and at time t5', the vehicle is brought into the ReadyON state. Thus, in the example shown in FIG. 7, a defect in the high-voltage battery 60 arises before the vehicle is brought into the "ReadyON" state. A defect in the high-voltage battery 60 may arise during the "ReadyON" state in a case other than the example shown in FIG. 6. In this case, the start switch is turned on to actuate the engine 12, and then a defect arises in the high-voltage battery 60. Then, with the engine 12 in operation, the first mode, corresponding to the high-voltage assist, shifts to the second mode, corresponding to the low-voltage assist.

Now, the ReadyON state battery defect occurrence process, including steps S3 and S5 to S13 in the flowchart shown in FIG. 5 and steps S13 to S19 in FIG. 8, will be described with reference to FIG. 6. Then, the ReadyOFF state battery defect occurrence process, including step S4 in FIG. 5, steps S4, S41 to S46, and S13 in FIG. 9, and steps S13 to S19 in FIG. 8, will be described with reference to FIG. 7. The ReadyON state battery defect occurrence process corresponds to power source defect process steps. In the power source defect process steps, while the first mode is being carried out, in which the voltage supplied by the high-voltage battery 60 is reduced so that the reduced voltage is supplied to the EPS 64, and when a defect occurs in the high-voltage battery 60, the high-voltage power source defect processing unit 100 shifts from execution of the first mode to execution of the second mode, in which the voltage supplied by the low-voltage battery 62 is increased so that the increased voltage is supplied to the EPS 64. Thereafter, the high-voltage power source defect processing unit 100 turns off the system relays 74, 76, and 78 to disconnect the high-voltage battery 60 and the driving circuit 72 from each other. The high-voltage power source defect processing unit 100 then shifts the second mode to the third mode, in which the voltage supplied by the generator 14 is reduced so that the reduced voltage is supplied to the EPS 64. The high-voltage power source defect processing unit 100 further drives the traveling motor 16 by the power generated by the generator 14.

That is, in the ReadyON state battery defect occurrence process, first, upon determining, at time t3 in FIG. 6, that a defect has arisen in the battery, the high-voltage power source defect processing unit 100 starts the engine 12 or keeps the engine 12 in operation, at time t4. In step S5 in FIG. 5, the high-voltage power source defect processing unit 100 shifts the first mode, corresponding to the high-voltage assist, to the second mode, corresponding to the low-voltage assist. In step S6, the high-voltage power source defect processing unit 100 outputs an instruction signal to the first DC/DC converter 66, the second DC/DC converter 68, and the second system relay 90, requesting the converters and relay to switch to the low-voltage assist. That is, the control section 71 instructs the system relay 90 to connect the low-voltage battery 62 and the second DC/DC converter 68 together; that is, to turn on the low-voltage battery 62 and the second DC/DC converter 68. The control section 71 also instructs the second DC/DC converter 68 to increase the low voltage of the low-voltage battery 62 to the intermediate voltage so as to allow the low-voltage battery 62 to supply power to the EPS 64. The control section 71 further instructs the first DC/DC converter 66 to stop supplying power to the EPS 64; that is, to turn off switching signals to the switching elements such as transistors which are provided in the first DC/DC converter 66. This process switches the power supply from the high-voltage battery 60 to the EPS 60 to the power supply from the low-voltage battery 62 to the EPS 64.

Then, in step S7 in FIG. 5, at time t5, the system relays 74, 76, and 78 are turned off. Thus, the power supply from the high-voltage battery 60 to the EPS 64 via the first DC/DC converter 66 is stopped, and then the system relays 74, 76, and 78 are turned off. This prevents the system relays 74, 76, and 78 from being turned off with an excessively high current flowing therethrough. Melting of the system relays 74, 76, and 78 can be effectively prevented. That is, to enable the battery-less emergency traveling, which avoids the use of the high-voltage battery 60, the system relays 74, 76, and 78 must be turned off. However, to prevent melting, the system relays 74, 76, and 78 must be turned off after the current flowing through the system relays 74, 76, and 78 is reduced to 0 A. For such a configuration, in the present embodiment, during normal traveling, the system relays 74, 76, and 78 are turned off after the high-voltage battery 60 is disconnected from all the loads connected to the high-voltage battery 60. In contrast, if the high-voltage battery 60 and the EPS 64 are simply disconnected from each other, in which is unlike the case of the present embodiment, the power supplied to the EPS 64 is rapidly reduced to zero. This method has room for improvement in terms of traveling performance. That is, rapidly reducing the power supplied to the EPS 64 to zero rapidly changes the steering assist force of the EPS 64. In contrast, there has also been proposed a method which, unlike the case of the present embodiment, immediately brings the vehicle into the ReadyOFF state without permitting a shift to the battery-less emergency traveling, in order to avoid a rapid change in steering assist force. However, in this case, the battery-less emergency traveling cannot be carried out, and the driver needs to wait for a tow truck or a carrier car on the road so that the vehicle can be conveyed to a service station. In the present embodiment, as described above, the system relays 74, 76, and 78 are turned off with the voltage from the low-voltage battery 62 increased so as to be supplied to the EPS 64. Thus, even if, during traveling of the hybrid vehicle with the EPS 64, a defect arises in the high-voltage battery 60, a possible rapid change in the steering assist force during traveling can be effectively prevented. Furthermore, as described below, since the voltage from the generator 14 can be reduced with the reduced voltage supplied to the EPS 64, the battery-less emergency traveling can be achieved over a sufficiently long distance.

Figure 10:
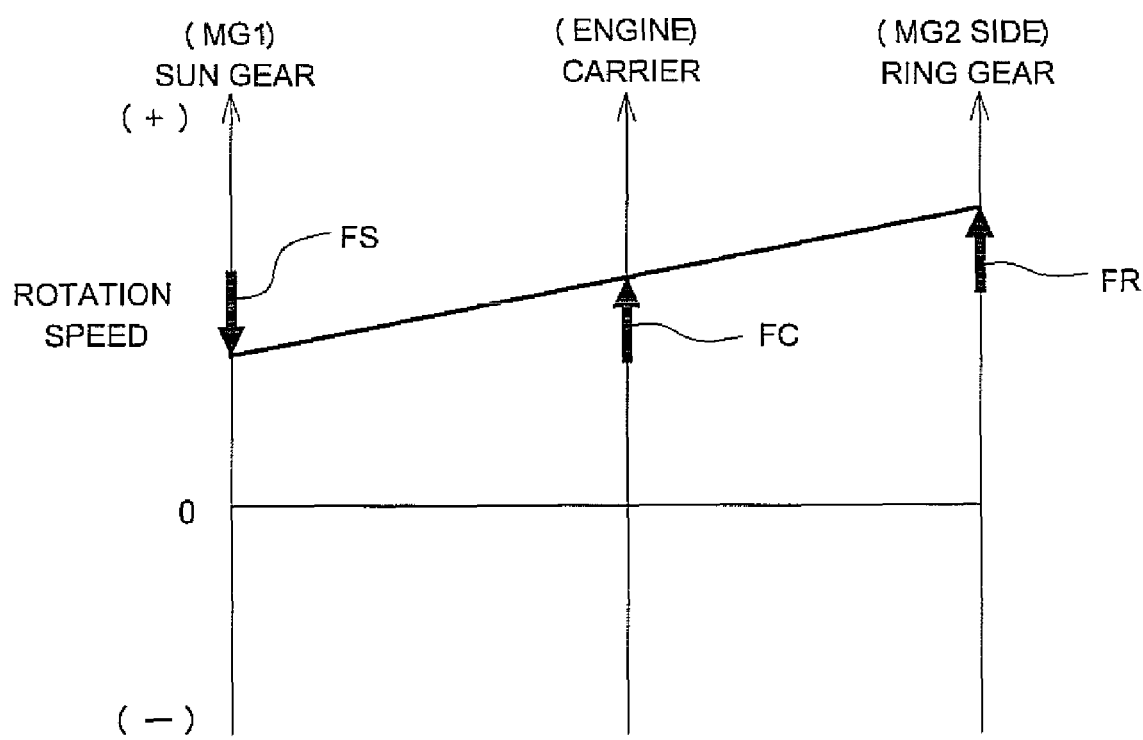
FIG. 10 is a collinear chart showing the relationship between rotation speeds of a sun gear, a carrier, and a ring gear in a planetary gear mechanism provided in a power-dividing section, the chart showing an example of emergency traveling performed when a defect occurs in a high-voltage battery.

That is, upon determining, in step S8 in FIG. 5, that a preset time for which the voltage VL across the first capacitor 80 remains stable has elapsed; that is, the voltage VL has remained at a preset predetermined value or higher continuously for a preset stable-state time or longer, the high-voltage power source defect processing unit 100 shifts to the third mode in step S9 at time t6. While the third mode is being carried out, the sun gear 28, the carrier 34, and the ring gear 30, provided in the power dividing section 22 (FIGS. 1 and 2), rotate in the same direction; for example, as shown in a collinear diagram in FIG. 10. In FIG. 10, the vertical axis indicates a rotation speed, (+) denotes forward rotation, and (−) denotes backward rotation. In such a nomographic diagram, the rotation speeds of the sun gear 28, the carrier 34, and the ring gear 30 have a linear relationship in association with the numbers of teeth in the ring gear 30 and the sun gear 28 when the carrier 34 is located between the sun gear 28 and the ring gear 30. In the example shown in FIG. 10, the engine 12 applies a forward torque FC to the carrier 34. The sun gear 28 and the traveling motor 16 apply a forward torque FR to the ring gear 30. Thus, a backward torque FS is applied to the sun gear 28. In this case, the direction of the torque of the carrier 34 and the ring gear 30 is opposite the direction of the torque FS of the sun gear 28. Thus, the generator 14 generates power, which is then supplied to the traveling motor 16.

After the vehicle shifts to the third mode, in step S10 in FIG. 5, the high-voltage power source defect processing unit 100 outputs an instruction signal to the first DC/DC converter 66, the second DC/DC converter 68, the second system relay 90, and the fourth DC/DC converter 84, requesting the converters to switch to the high-voltage assist. That is, the high-voltage power source defect processing unit 100 turns off the second system relay 90 and allows the second DC/DC converter 68 to stop supplying power from low-voltage battery 62 to the EPS 64. That is, the high-voltage power source defect processing unit 100 turns off switching signals to the switching elements provided in the second DC/DC converter 68. The high-voltage power source defect processing unit 100 further turns off the second system relay 90 between the low-voltage battery 62 and the second DC/DC converter 68. To allow the power from the generator 14 side to be supplied to the EPS 64, the high-voltage power source defect processing unit 100 also instructs the fourth DC/DC converter 84 to reduce the high voltage of the power generated by the generator 14 and instructs the first DC/DC converter 66 to further reduce the voltage VL across the first capacitor 80 to obtain and supply the intermediate voltage to the EPS 64. Thus, after time t6, EPS battery-less control is performed in which the EPS 64 is actuated without the need to supply the EPS 64 with power from both the high-voltage battery 60 and the low-voltage battery 62.

Then, upon determining, in step S11 in FIG. 5, that a preset time for which the voltage VL across the first capacitor 80 remains stable has elapsed; that is, that the voltage VL has remained at a preset predetermined value or higher continuously for a preset stable-state time or longer, the high-voltage power source defect processing unit 100 shifts to step S12 to output a signal for a gate permission request to the third DC/DC converter 70. The high-voltage power source defect processing unit 100 thus reduces the voltage VL across the first capacitor 80, which corresponds to the high voltage generated by the generator 14, and supplies the reduced voltage to the low-voltage battery 62 for charging.

Figure 8:
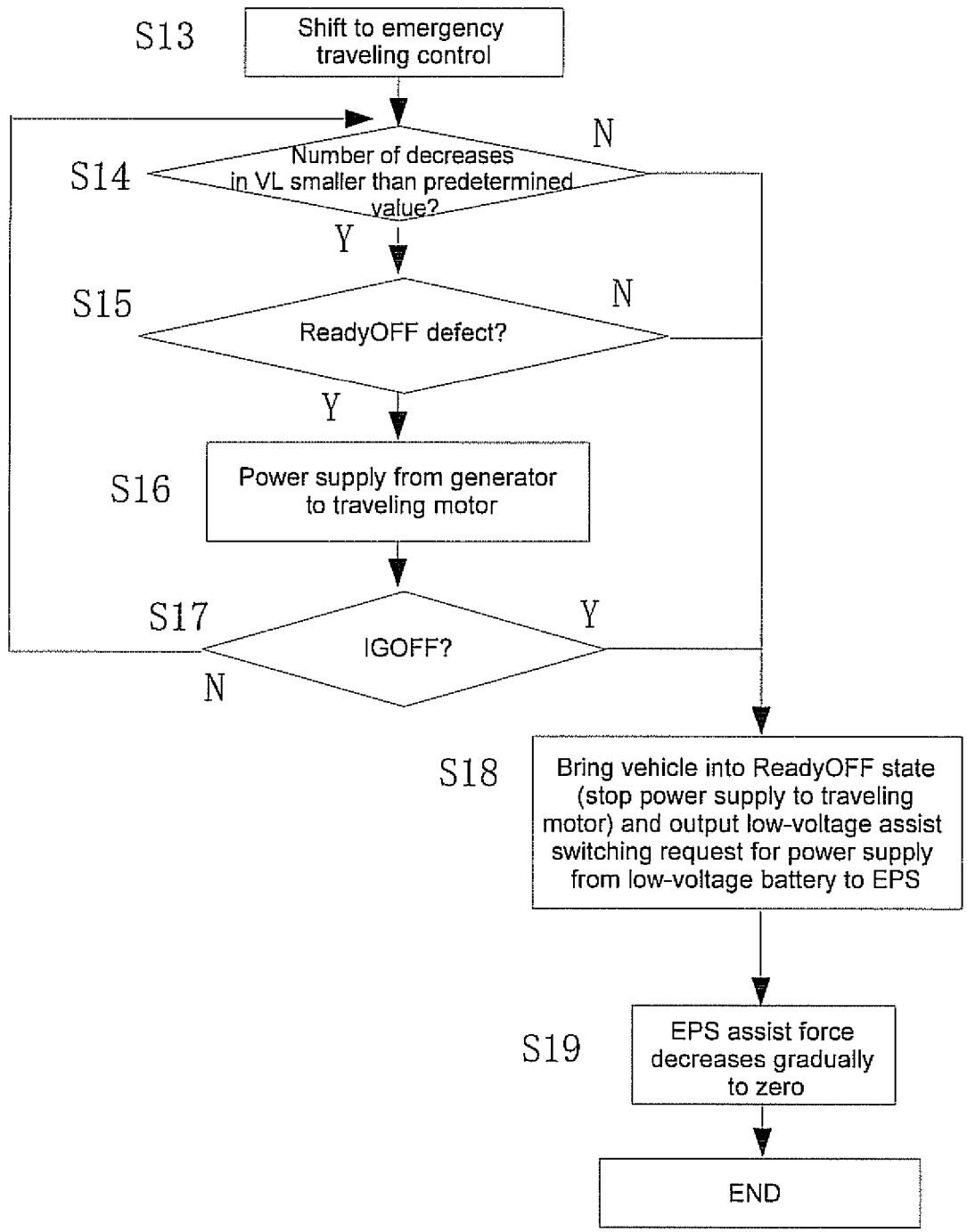
FIG. 8 is flowchart showing steps of the method for controlling the hybrid vehicle in the exemplary embodiment according to the present invention, the steps being carried out after the vehicle shifts to emergency traveling control.

Then, the high-voltage power source defect processing unit 100 shifts to emergency traveling control in step S13 to carry out processing from steps S13 to S19 in FIG. 8. First, in step S14 in FIG. 8, the high-voltage power source defect processing unit 100 determines whether or not the number of times that the voltage VL across the first capacitor 80 decreases to less than a predetermined value is smaller than a preset predetermined value. Upon determining that the number of times is smaller than the preset predetermined value, the high-voltage power source defect processing unit 100 determines, in step S15, whether or not a "ReadyOFF defect" that is such a defect that brings the vehicle into the ReadyOFF state has arisen. The "ReadyOFF defect" means that, for example, a defect arises in at least one of the generator 14, the traveling motor 16, the traveling motor inverter 88, and the generator inverter 86. For example, the defect in the generator 14 or the traveling motor 16 may be a defect in a sensor detecting the rotation speed of the generator 14 or the traveling motor 16. Furthermore, the ReadyOFF defect may be, for example, an excessive decrease in the voltage VL across the first capacitor 80 or the voltage VH across the second capacitor; that is, a decrease in voltage VL or VH to a preset predetermined value or lower. Upon determining, in step S15, that no ReadyOFF defect has arisen, the high-voltage power source defect processing unit 100, in step S16, allows the generator 14 to supply power to the traveling motor 16. Then, in step S17, the high-voltage power source defect processing unit 100 determines whether or not the start switch, having the functions of the ignition switch, has been turned off by the driver. Upon determining that the start switch has not been turned off, the high-voltage power source defect processing unit 100 returns to step S14 to repeat steps S14 to S17.

In contrast, upon determining, in step S14, that the number of times that the voltage VL across the first capacitor 80 decreases to less than the predetermined value is equal to or larger than the preset predetermined value; determining, in step S15, that a ReadyOFF defect has arisen; or determining, in step S17, that the start switch is off, the high-voltage power source defect processing unit 100 shifts to step S18 to bring the vehicle into the ReadyOFF state, in which the power supply from the generator 14 to the traveling motor 16 is stopped. The high-voltage power source defect processing unit 100 further outputs a low-voltage assist switching request to the driving circuit 72, the first DC/DC converter 66, the second DC/DC converter 68, and the second system relay 90 to instruct the circuit 72, the converters 66 and 68, and the relay 90 to switch from the high-voltage assist, in which the voltage from the generator 14 is reduced, with the reduced voltage supplied to the EPS 64, to the low-voltage assist, in which the voltage from the low-voltage battery 62 is increased, with the increased voltage supplied to the EPS 64. That is, in the high-voltage power source defect process, the high-voltage power source defect processing unit 100 shifts from execution of the third mode to execution of the second mode. The period after t7 in FIG. 6 corresponds to the case in which the high-voltage power source defect processing unit 100 determines, in step S17, that the start switch is off. That is, in step S19, the control section 71 controls the second DC/DC converter 68 such that the steering assist force exerted on the steering wheel by the EPS 64 decreases gradually to zero. The control section 71 thus gradually reduces the ratio of the steering assist force to the steering force on the steering wheel, for example, so that the ratio temporarily varies linearly or curvedly. In this case, the engine 12 is stopped and is in the ReadyOFF state. This configuration prevents the steering assist force of the EPS 64 from decreasing rapidly to zero even if a ReadyOFF defect arises during emergency traveling. Furthermore, even if the steering wheel is being turned when the start switch is turned off, a possible rapid, strong force arising from a restoration force can be effectively prevented from being transmitted from the steering wheel to the driver's hands, because the steering assist force decreases rapidly to zero.

When "low-voltage backup" is carried out in which the low-voltage battery 62 supplies power to the EPS 64, an energy limit and a power supply number limit for the low-voltage backup are set. That is, the "low-voltage backup" has been proposed to be carried out only if, in connection with the power supply number limit, the voltage VL across the first capacitor 80 decreases to a preset first predetermined voltage value or smaller. In this case, the high-voltage power source defect processing unit 100 determines that the "high-voltage assist" cannot be effectively carried out, in which the power from the high-voltage battery 60 or the generator 14 is supplied to the EPS 64. Furthermore, the high-voltage assist has been proposed to be recovered if the voltage VL across the first capacitor 80 increases to at least a second predetermined voltage value greater than the first predetermined voltage value. In this case, when the voltage VL decreases again to the first predetermined value or lower, the high-voltage assist is shifted again to the low-voltage assist. In this manner, the low-voltage backup may be repeated a number of times as a result of a variation in the voltage VL across the first capacitor 80. However, when the low-voltage assist is repeated a preset predetermined number of times or more, the number reaches or exceeds the limit. This results in what is called a heavy steering wheel state in which the vehicle is no longer shifted to the low-voltage assist, with no power supplied to the EPS 64.

In contrast, if the EPS battery-less control is performed as described below, since the high-voltage battery 60 is disconnected from the driving circuit 72, the voltage VL is more unstable than during the normal traveling. The voltage VL may vary significantly, depending particularly on the road surface condition. Thus, without modification of the configuration, a possible variation in voltage VL may increase the likelihood that the number of low-voltage assist operations reaches or exceeds the limit. Consequently, the assist force of the EPS 64 is likely to decrease rapidly to zero. In the present embodiment, in step S14 in FIG. 8, as determining whether the number of times that the voltage VL across the first capacitor 80 decreases to less than a preset predetermined voltage value is smaller than a value set for the number limit, the high-voltage power source defect processing unit 100 determines whether the number is smaller than a preset ReadyOFF shift condition number. Upon determining that the number is not smaller than the preset ReadyOFF shift condition number; that is, the number is equal to or greater than the preset ReadyOFF shift condition number, the high-voltage power source defect processing unit 100 shifts to step S18 to bring the vehicle into the ReadyOFF state. The high-voltage power source defect processing unit 100 further shifts to the low-voltage assist to gradually reduce the steering assist force of the EPS 64 to zero. This prevents the vehicle from being rapidly brought into the heavy steering wheel state during traveling. That is, if a defect arises in at least one of the generator 14, the traveling motor 16, and the driving circuit 72 during a shift to the third mode following occurrence of the defect in the high-voltage battery 60, the high-voltage power source defect processing unit 100 shifts from execution of the third mode to execution of the second mode. Furthermore, in the high-voltage power source defect process, after the shift to the third mode following the occurrence of the defect in the high-voltage battery 60, upon determining that an abnormality has occurred in the voltage VL across the first capacitor 80 or the voltage VH across the second capacitor; that is, the detected voltage value of the driving circuit 72, the high-voltage power source defect processing unit 100 stops the power supply from the generator 14 to the traveling motor 16. That is, the vehicle is brought in to the ReadyOFF state, with the steering assist force of the EPS 64 gradually reduced.

Now, with reference to FIGS. 5 and 7 to 9, description will be given of the "ReadyOFF state battery defect occurrence process" carried out by the high-voltage power source defect processing unit 100 upon determining, in step S2 in FIG. 5, that a defect in the battery did not arise during the ReadyON state; that is, the defect in the battery occurred before the ReadyON state; that is, during the ReadyOFF state. The ReadyOFF state battery defect occurring process is carried out by the control section 71 by actuating the engine 12 and then executing the third mode, in which the power supplied by the generator 14 is reduced so that the reduced voltage is supplied to the EPS 64, without executing the first mode or the second mode.

That is, in the ReadyOFF state battery defect occurrence process, first, at time t2' in FIG. 7, the high-voltage power source defect processing unit 100 determines that a defect in the battery arose during the ReadyOFF state. Then, at time t3', the starter signal, allowing the generator 14 to provide the functions of the starter, is turned on. At time t4', the system relays 74, 76, and 78 are turned on to start the engine 12 (step S41 in FIG. 9). The engine 12 is started to allow the generator 14 to generate power, which is then supplied to the traveling motor 16. At time t5', the vehicle is brought into the ReadyON state. At the same time, the system relays 74, 76, and 78 are turned off (step S42 in FIG. 9). Furthermore, at time t6', the vehicle shifts to the third mode (step S43). In step S44 in FIG. 9, the control section 71 outputs an instruction signal requesting the first DC/DC converter 66 and the fourth DC/DC converter 84 to switch to the high-voltage assist. That is, to allow the power from the generator 14 to be supplied to the EPS 64, the high-voltage power source defect processing unit 100 instructs the fourth DC/DC converter 84 to reduce the high voltage of the power generated by the generator 14 and instructs the first DC/DC converter 66 to further reduce the voltage VL across the first capacitor 80 to obtain the intermediate voltage. In this case, the second system relay 90 is turned off. Furthermore, the switching signals to the switching elements provided in the second DC/DC converter 68 are tuned off. Thus, the EPS battery-less control is started at time t6'.

Figure 9:
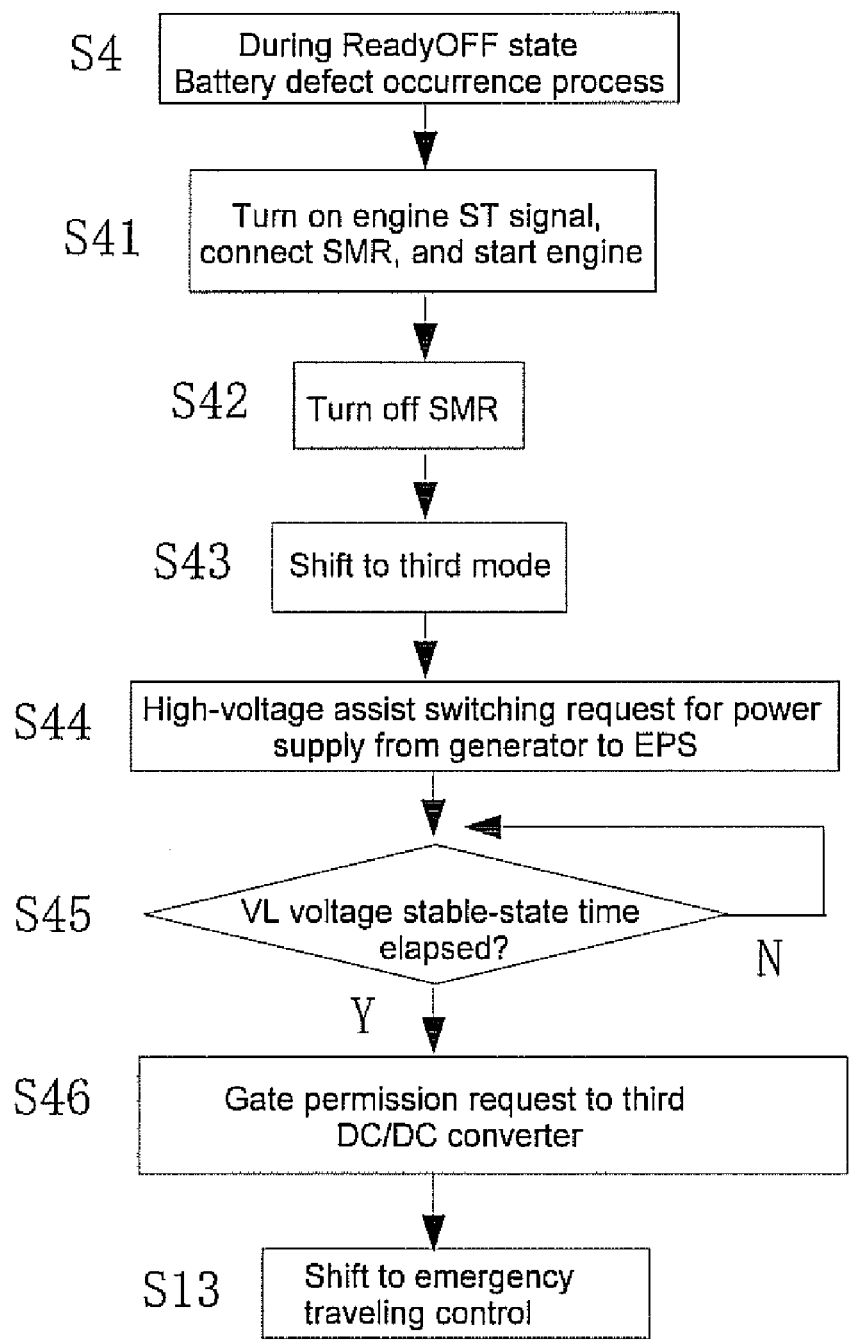
FIG. 9 is a flowchart of steps of the ReadyOFF state battery defect occurrence process carried out until the vehicle shifts to the emergency traveling control.

Then, upon determining, in step S45 in FIG. 9, that a preset time for which the voltage VL across the first capacitor 80 remains stable has elapsed; that is, the voltage VL has remained at a preset predetermined value or higher continuously for a preset predetermined time or longer, the high-voltage power source defect processing unit 100 shifts to step S46 to output a signal for a gate permission request to the third DC/DC converter 70. The high-voltage power source defect processing unit 100 thus reduces the voltage VL across the first capacitor 80, which corresponds to the high voltage generated by the generator 14, and supplies the reduced voltage to the low-voltage battery 62 for charging.

Then, the high-voltage power source defect processing unit 100 shifts to the emergency traveling control in step S13 in FIG. 4. The high-voltage power source defect processing unit 100 then carries out the processing from steps S13 to S19 in FIG. 8 as is the case with the above-described ReadyON state battery defect occurrence process. The period after t7' in FIG. 7 corresponds to the case in which the high-voltage power source defect processing unit 100 determines, in step S17 in FIG. 4, that the start switch is off. That is, in step S19, the control section 71 controls the second DC/DC converter 68 such that the steering assist force exerted on the steering wheel by the EPS 64 decreases gradually to zero. The control section 71 thus gradually reduces the ratio of the steering assist force to the steering force on the steering wheel, for example, so that the ratio temporally varies linearly or curvedly. In this case, the engine 12 is stopped and is in the ReadyOFF state.

According to the above-described control system and method for the hybrid vehicle according to the present embodiment, even if a defect in the high-voltage battery 60 occurs during traveling of the hybrid vehicle 10 with the EPS 64, the traveling motor 16 can be driven using not only the power stored in the low-voltage battery 62 but also the power from the generator 14. This enables the battery-less emergency traveling over a sufficiently long distance. Furthermore, before the high-voltage battery 60 and the driving circuit 72 are disconnected from each other by turning off the system relays 74, 76, and 78, the vehicle shifts to the second mode, in which the voltage from the low-voltage battery 62 is increased, with the increased voltage supplied to the EPS 64. Thus, even though the high-voltage battery 60 and the driving circuit 72 are disconnected from each other in order to achieve the battery-less emergency traveling, the steering assist force can be effectively prevented from changing rapidly during traveling.

The control system for the hybrid vehicle according to the present embodiment further includes the third DC/DC converter 70 provided between the driving circuit 72 and the low-voltage battery 62. After the shift to the second mode following the occurrence of the defect in the high-voltage battery 60, the high-voltage power source defect processing unit 100 sets the third DC/DC converter 70 use start timing when the power supply from the generator 14 to the low-voltage battery 62 via the third DC/DC converter 70 is enabled, to be different from the first DC/DC converter 66 use start timing when the power supply from the generator 14 to the EPS 64 via the first DC/DC converter 66 is enabled. More specifically, the first DC/DC converter 66 use start timing is set to take place earlier than the third DC/DC converter 70 use start timing. Furthermore, in the control method for the hybrid vehicle according to the present embodiment, the hybrid vehicle 10 includes the third DC/DC converter 70 provided between the driving circuit 72 and the low-voltage battery 62. In the high-voltage power source defect process steps, after the shift to the second mode following the occurrence of the defect in the high-voltage battery, the control section 71 sets the third DC/DC converter 70 use start timing when the power supply from the generator 14 to the low-voltage battery 62 via the third DC/DC converter 70 is enabled, to be different from the first DC/DC converter 66 use start timing when the power supply from the generator 14 to the EPS 64 via the first DC/DC converter 66 is enabled. More specifically, the first DC/DC converter 66 use start timing is set to take place earlier than the third DC/DC converter 70 use start timing. Thus, the voltage of the driving circuit 72 can be effectively inhibited from becoming unstable. That is, after completion of the shift to the battery-less emergency traveling, power needs to be supplied to all the loads connected to the high-voltage battery 60 during the normal traveling. However, when the first DC/DC converter 66 and the third DC/DC converter 70 are actuated simultaneously, the voltage VL across the first capacitor 80 may vary significantly, because the high-voltage battery 60 is disconnected. In contrast, when the third DC/DC converter 70 use start timing is different from the first DC/DC converter 66 use start timing, the possible variation in voltage VL can be reduced to a sufficiently small level. That is, the reduced variation in voltage VL facilitates the quick recovery of the voltage VL to the normal value. Additionally, since the first DC/DC converter 66 use start timing is set to take place earlier than the third DC/DC converter 70 use start timing, the possible rapid change in the steering assist force of the EPS 64 can be effectively reduced to a sufficiently small value.

Furthermore, in the ReadyOFF state battery defect occurrence process shown in FIG. 7, if a defect arises in the battery, even when the system relays 74, 76, and 78 are connected in order to start the engine 12, the high-voltage battery 60 avoids supplying power to the EPS 64, and the vehicle shifts to the battery-less emergency traveling, in which the power from the generator 14 is supplied to the traveling motor. Then, the voltage of the power from the generator 14 is reduced, and the power with the reduced voltage is supplied to the EPS 64. This eliminates the need to turn on a gate signal to the second DC/DC converter 68, provided between the low-voltage battery 62 and the EPS 64. Additionally, if a low-voltage assist lamp provided on an instrument panel or the like located around the driver's seat is illuminated when the low-voltage battery 62 supplies power to the EPS 64, the need for the illumination is eliminated.

In the above description, in the hybrid vehicle control system shown in FIG. 3, the system relays 74, 76, and 78 serving as a turn-off section are provided between the low-voltage battery 62 and the second DC/DC converter 68. However, the present invention is not limited to this configuration. A circuit having the functions of the turn-off section may be incorporated into the second DC/DC converter 68. For example, a switching element such as a transistor which serves as the turn-off section may be provided on a power supply line to the second DC/DC converter 68 so that the control section 71 can input an on signal to the switching element to connect the power supply line and the EPS 64 together. In this case, to disconnect the low-voltage battery 62 and the EPS 64 from each other, the control section 71 may turn off the switching element, serving as the turn-off section.

In the present embodiment, in the hybrid vehicle 10 (FIG. 1), power applied to the output shaft 26 is delivered directly to the drive shaft 52. However, the hybrid vehicle to be controlled according to the present invention is not limited to this configuration. For example, a transmission may be provided on the power transmission path between the output shaft 26 and an axle coupled to the rear wheels 56.

The hybrid vehicle to be controlled according to the present invention is not limited to the case where power from the traveling motor 16 is applied to the output shaft 26 via the speed-reducing gear section 24, which reduces the speed to a low-speed value or a high-speed value. For example, the power from the traveling motor 16 may be applied to the output shaft 26 via a single-stage speed-reducing gear section; that is, a speed-reducing gear section composed only of a pair of gears. Alternatively, the traveling motor 16 located coaxially with the output shaft 26 may apply power to the output shaft 26.

What is claimed is:

1. A control system for a hybrid vehicle driven to travel using at least one of an engine and a traveling motor as a main driving source, the hybrid vehicle comprising:
   a generator driven by the engine;
   a high-voltage power source connected to the generator and the traveling motor via a driving circuit;
   a low-voltage power source charged at a voltage lower than that of the high-voltage power source;
   an electric power steering device connected to the driving circuit via a voltage-reducing circuit and driven by supplied power of a voltage intermediate between the low voltage of the low-voltage power source and the high voltage of the high-voltage power source;
   a voltage-increasing circuit provided between the low-voltage power source and the electric power steering device and configured to increase the low voltage of the low-voltage power source and to supply the increased voltage to the electric power steering device; and
   a control section,
   wherein the control section comprises:
   first mode execution unit for allowing the voltage-reducing circuit to reduce the high voltage of the high-voltage power source and supplying a resultant intermediate voltage to the electric power steering device;
   second mode execution unit for allowing the voltage increasing circuit to increase the low voltage of the low-voltage power source and supplying the resultant intermediate voltage to the electric power steering device;
   third mode execution unit for, with the high-voltage power source and the driving circuit disconnected from each other, allowing the voltage-reducing circuit to reduce a voltage corresponding to power generated by the generator and supplying the resultant intermediate voltage to the electric power steering device; and
   high-voltage power source defect processing unit for, while the first mode is being executed and when a defect arises in the high-voltage power source, shifting from execution of the first mode to execution of the second mode, then disconnecting the high-voltage power source and the driving circuit from each other, and thereafter shifting the second mode to the third mode, while allowing the traveling motor to be driven by power generated by the generator.

2. The control system for the hybrid vehicle according to claim 1, wherein if a defect arises in at least one of the generator, the traveling motor and the driving circuit during the shift to the third mode following the occurrence of the defect in the high-voltage power source, the high-voltage power source defect processing unit shifts from execution of the third mode to execution of the second mode.

3. The control system for the hybrid vehicle according to claim 1, further comprising a second voltage-reducing circuit provided between the driving circuit and the low-voltage power source,
   wherein after the shift to the second mode following the occurrence of the defect in the high-voltage power source, the high-voltage power source defect processing unit sets a second voltage-reducing circuit use start timing when a power supply from the generator to the low-voltage power source via the second voltage reducing circuit is enabled, to be different from a voltage-reducing circuit start timing when a power supply from the generator to the electric power steering device via the voltage-reducing circuit is enabled.

4. The control system for the hybrid vehicle according to claim 1, further comprising a voltage-detecting unit for detecting a voltage of the driving circuit,
   wherein if an abnormality occurs in the detected voltage value of the driving circuit after the shift to the third mode following the occurrence of the defect in the high-voltage power source, the high-voltage power source defect processing unit stops the power supply from the generator to the traveling motor.

5. The control system for the hybrid vehicle according to claim 1, the driving circuit comprising a switch provided between the high-voltage power source and both the generator and the traveling motor and configured to be turned on and off;
   a second voltage-reducing circuit provided between the driving circuit and the low-voltage power source; and
   a voltage-increasing circuit and reducing provided between the switch and both the generator and the traveling motor and configured to reduce the voltage supplied by the generator and to supply the reduced voltage to the voltage-reducing circuit and the second voltage reducing circuit, the voltage-increasing and reducing circuit being configured to increase the voltage supplied by the high-voltage power source and to supply the increased voltage to at least one of the generator and the traveling motor.

6. A control method for a hybrid vehicle driven to travel using at least one of an engine and a traveling motor as a main driving source, the hybrid vehicle comprising:
   a generator driven by the engine;
   a high-voltage power source connected to the generator and the traveling motor via a driving circuit;
   a low-voltage power source charged at a voltage lower than that of the high-voltage power source;
   an electric power steering device connected to the driving circuit via a voltage-reducing circuit and driven by supplied power of a voltage intermediate between the low voltage of the low-voltage power source and the high voltage of the high-voltage power source;
   a voltage-increasing circuit provided between the low-voltage power source and the electric power steering device and configured to increase the low voltage of the low-voltage power source and to supply the increased voltage to the electric power steering device; and a control section,
   wherein the control section comprises:
   first mode execution unit for allowing the voltage-reducing circuit to reduce the high voltage of the high-voltage power source and supplying a resultant intermediate voltage to the electric power steering device;
   second mode execution unit for allowing the voltage-increasing circuit to increase the low voltage of the low-voltage power source and supplying the resultant intermediate voltage to the electric power steering device; and
   third mode execution unit for, with the high-voltage power source and the driving circuit disconnected from each other, allowing the voltage-reducing circuit to reduce a voltage corresponding to power generated by the generator and supplying the resultant intermediate voltage to the electric power steering device, and
   the method comprises a high-voltage power source defect process step in which while the first mode is being executed and a defect arises in the high-voltage power source, the control section shifts from execution of the first mode to execution of the second mode, then disconnects the high-voltage power source and the driving circuit from each other, and thereafter shifts the second mode to the third mode, while allowing the traveling motor to be driven by power generated by the generator.

7. The control method for the hybrid vehicle according to claim 6, wherein in the high-voltage power source defect process step, if a defect arises in at least one of the generator, the traveling motor and the driving circuit during the shift to the third mode following the occurrence of the defect in the high-voltage power source, the control section shifts from execution of the third mode to execution of the second mode.

8. The control method for the hybrid vehicle according to claim 6, wherein the hybrid vehicle further comprises a second voltage-reducing circuit provided between the driving circuit and the low-voltage power source, and in the high-voltage power source defect process step, after the shift to the second mode following the occurrence of the defect in the high-voltage power source, the control section sets a second voltage-reducing circuit use start timing when a power supply from the generator to the low-voltage power source via the second voltage-reducing circuit is enabled, to be different from a voltage-reducing circuit use start timing when a power supply from the generator to the electric power steering device via the voltage-reducing circuit is enabled.

9. The control method for the hybrid vehicle according to claim 6, wherein the hybrid vehicle further comprises a voltage-detecting unit for detecting a voltage of the driving circuit, and in the high-voltage power source defect process step, if an abnormality occurs in the detected voltage value of the driving circuit after the shift to the third mode following the occurrence of the defect in the high-voltage power source, the control section stops the power supply from the generator to the traveling motor.

* * * * *

UNITED STATES PATENT AND TRADEMARK OFFICE
CERTIFICATE OF CORRECTION

| | |
|---|---|
| PATENT NO. | : 7,857,081 B2 |
| APPLICATION NO. | : 12/501050 |
| DATED | : December 28, 2010 |
| INVENTOR(S) | : Takeshi Kishimoto |

It is certified that error appears in the above-identified patent and that said Letters Patent is hereby corrected as shown below:

Column 3, lines 9-10 - delete "a non-off" and insert --an on-off--
Column 21, line 61 - delete "use"
Column 23, line 18 - delete "use"
Column 24, line 4 - delete "use"

Signed and Sealed this
Fifth Day of July, 2011

David J. Kappos
*Director of the United States Patent and Trademark Office*